US011468881B2

(12) United States Patent
Nama et al.

(10) Patent No.: US 11,468,881 B2
(45) Date of Patent: Oct. 11, 2022

(54) METHOD AND SYSTEM FOR SEMANTIC INTELLIGENT TASK LEARNING AND ADAPTIVE EXECUTION

(71) Applicant: Samsung Electronics Co., Ltd., Suwon-si (KR)

(72) Inventors: Sandeep Nama, Santa Clara, CA (US); Hongxia Jin, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 16/370,497

(22) Filed: Mar. 29, 2019

(65) Prior Publication Data
US 2020/0312299 A1 Oct. 1, 2020

(51) Int. Cl.
*G10L 15/06* (2013.01)
*G06F 16/901* (2019.01)
*G10L 15/30* (2013.01)

(52) U.S. Cl.
CPC ........ *G10L 15/063* (2013.01); *G06F 16/9024* (2019.01); *G10L 15/30* (2013.01); *G10L 2015/0638* (2013.01)

(58) Field of Classification Search
CPC .............. G06F 17/30259; G06F 3/048; G06F 3/04886; G10L 15/063
See application file for complete search history.

(56) References Cited

U.S. PATENT DOCUMENTS

| 6,131,187 A * | 10/2000 | Chow ................. G06F 8/52 717/106 |
| 6,539,433 B1 * | 3/2003 | Tominaga ............ G06F 9/445 709/202 |
| 6,625,797 B1 * | 9/2003 | Edwards ............ G06F 30/30 716/132 |
| 7,546,576 B2 | 6/2009 | Egli et al. |
| 7,933,766 B2 * | 4/2011 | Gupta ............... G10L 15/063 704/9 |
| 7,958,499 B2 | 6/2011 | Doi et al. |

(Continued)

FOREIGN PATENT DOCUMENTS

| EP | 3347812 A1 | 9/2016 |
| JP | 2002-259113 A | 9/2002 |

(Continued)

OTHER PUBLICATIONS

Shi, T. et al., "World of Bits: An Open-Domain Platform for Web-Based Agents", Proceedings of the 34th International Conference on Machine Learning, Aug. 2017, pp. 3135-3144, PMLR 70, United States.

(Continued)

*Primary Examiner* — Anne L Thomas-Homescu
(74) *Attorney, Agent, or Firm* — Sherman IP LLP; Kenneth L. Sherman; Steven Laut

(57) ABSTRACT

A method includes receiving, at an electronic device, a command directed to a first application operated by the electronic device. Features presented by the first application in response to interactions with the first application are captured at the electronic device. Data communicated with the first application via the interactions with the first application are captured at the electronic device. A task is learned based on the captured features and communicated data.

27 Claims, 15 Drawing Sheets

(56) References Cited

U.S. PATENT DOCUMENTS

| | | | |
|---|---|---|---|
| 7,983,997 B2* | 7/2011 | Allen | G06F 3/038 706/12 |
| 8,407,057 B2* | 3/2013 | Comerford | G10L 15/22 704/275 |
| 8,670,972 B1 | 3/2014 | Varman et al. | |
| 9,064,222 B2* | 6/2015 | Saad | G05D 1/00 |
| 9,454,732 B1 | 9/2016 | Garton | G06N 20/00 |
| 9,519,780 B1* | 12/2016 | Dong | H04L 63/1408 |
| 9,916,328 B1* | 3/2018 | Sharifi | G06F 3/04845 |
| 10,082,954 B2* | 9/2018 | Jarrous | G06F 3/04886 |
| 10,114,624 B1* | 10/2018 | Makkar | G06F 8/37 |
| 10,163,436 B1* | 12/2018 | Slifka | G10L 13/00 |
| 10,229,680 B1 | 3/2019 | Gillespie et al. | |
| 10,496,705 B1* | 12/2019 | Irani | G06F 9/451 |
| 2002/0038301 A1* | 3/2002 | Aridor | G06F 9/465 |
| 2005/0028132 A1* | 2/2005 | Srinivasamurthy | G06F 9/45516 717/100 |
| 2005/0042593 A1* | 2/2005 | Hopkins | G09B 5/00 434/350 |
| 2006/0230319 A1* | 10/2006 | Ryali | G06F 11/3684 714/38.14 |
| 2010/0192063 A1* | 7/2010 | Saoumi | G09B 19/0053 715/707 |
| 2011/0038512 A1 | 2/2011 | Petrou et al. | |
| 2011/0060709 A1* | 3/2011 | Ide | G01C 21/3484 706/12 |
| 2011/0071813 A1* | 3/2011 | Bohizic | G06F 12/1027 703/26 |
| 2012/0246487 A1* | 9/2012 | Gu | G06F 21/51 713/190 |
| 2013/0036409 A1* | 2/2013 | Auerbach | G06F 8/456 717/140 |
| 2013/0067497 A1* | 3/2013 | Seo | G06F 3/0346 719/318 |
| 2013/0254139 A1 | 9/2013 | Lei | |
| 2013/0275164 A1* | 10/2013 | Gruber | G06Q 10/02 705/5 |
| 2014/0036023 A1 | 2/2014 | Croen et al. | |
| 2014/0067392 A1 | 3/2014 | Burke et al. | |
| 2014/0136179 A1* | 5/2014 | Bohizic | G06F 9/45545 703/26 |
| 2014/0201629 A1* | 7/2014 | Heck | G06N 5/022 715/708 |
| 2014/0282493 A1* | 9/2014 | Glover | G06F 8/61 717/176 |
| 2015/0074653 A1 | 3/2015 | Eracar et al. | |
| 2016/0210445 A1 | 7/2016 | Deaver et al. | |
| 2016/0246623 A1* | 8/2016 | Ajila | G06F 9/4552 |
| 2016/0328522 A1* | 11/2016 | Howley | G06F 3/0482 |
| 2017/0024561 A1 | 1/2017 | Hajmasan et al. | |
| 2017/0098159 A1* | 4/2017 | Sharifi | G06F 3/0482 |
| 2017/0277396 A1* | 9/2017 | Chung | G06F 3/0482 |
| 2017/0337211 A1 | 11/2017 | Netsch et al. | |
| 2017/0344349 A1* | 11/2017 | He | G06F 11/3466 |
| 2018/0032731 A1* | 2/2018 | De | G06F 11/3612 |
| 2018/0189615 A1 | 7/2018 | Kang et al. | |
| 2018/0203674 A1* | 7/2018 | Dayanandan | G06F 9/451 |
| 2018/0336049 A1 | 11/2018 | Mukherjee et al. | |
| 2018/0349105 A1* | 12/2018 | Makkar | G06F 8/33 |
| 2018/0349450 A1 | 12/2018 | Smyth et al. | |
| 2018/0367483 A1* | 12/2018 | Rodriguez | H04L 65/60 |
| 2019/0050273 A1* | 2/2019 | Tamir | H04L 47/23 |
| 2019/0079753 A1* | 3/2019 | Makkar | G06N 5/022 |
| 2019/0080698 A1* | 3/2019 | Miller | G10L 17/02 |
| 2019/0102482 A1* | 4/2019 | Ni | G06F 40/216 |
| 2019/0121612 A1* | 4/2019 | Ashoori | G06F 40/20 |
| 2019/0187964 A1* | 6/2019 | Wyse | G06F 8/441 |
| 2019/0222540 A1* | 7/2019 | Relangi | G06Q 30/01 |
| 2019/0341039 A1* | 11/2019 | Bharadwaj | G06F 40/216 |
| 2019/0348030 A1* | 11/2019 | Anders | G10L 15/19 |
| 2019/0392345 A1* | 12/2019 | Adaska | G06N 5/04 |
| 2020/0026554 A1 | 1/2020 | Kogure et al. | |
| 2020/0057541 A1* | 2/2020 | Wantland | G06F 3/0484 |
| 2020/0257996 A1* | 8/2020 | London | G06N 5/04 |
| 2020/0279556 A1* | 9/2020 | Gruber | G06F 3/167 |
| 2020/0311210 A1 | 10/2020 | Nama et al. | |
| 2021/0224378 A1* | 7/2021 | Krey | G06F 9/45558 |

FOREIGN PATENT DOCUMENTS

| | | |
|---|---|---|
| JP | 2014048805 A | 3/2014 |
| KR | 2001-0076775 A | 8/2001 |
| KR | 10-1348645 B1 | 12/2013 |

OTHER PUBLICATIONS

International Search Report and Written Opinion dated Jun. 11, 2020 for International Application PCT/KR2020/003040 from Korean Intellectual Property Office, pp. 1-8, Republic of Korea.

U.S. Non-Final Office Action for U.S. Appl. No. 16/370,411 dated Sep. 25, 2020.

U.S. Notice of Allowance for U.S. Appl. No. 16/370,411 dated Apr. 13, 2021.

Extended European Search Report dated Mar. 17, 2022 for European Application No. 20783310.4 from European Patent Office. pp. 1-10, Munich, Germany.

Li, T. J-J. et al., "SUGILITE: Creating Multimodal Smartphone Automationby Demonstration", Proceedings of the 2017 CHI conference on human factors in computing systems, May 2, 2017, pp. 6038-6049.

* cited by examiner

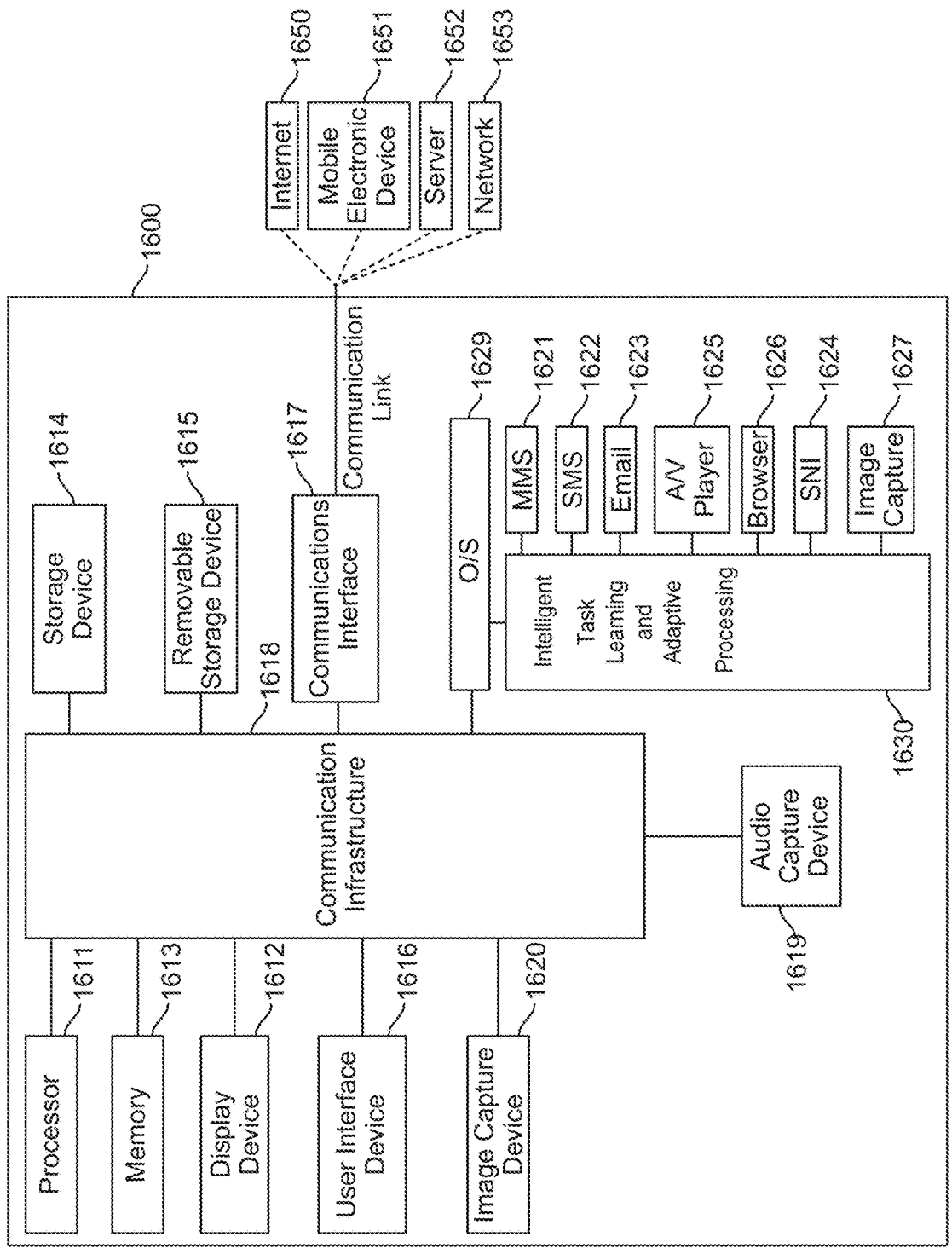

METHOD AND SYSTEM FOR SEMANTIC INTELLIGENT TASK LEARNING AND ADAPTIVE EXECUTION

CROSS-REFERENCE TO RELATED APPLICATIONS

This application is related to U.S. Ser. No. 16/370,411 filed on Mar. 29, 2019, which is incorporated by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to task learning via demonstration on electronic devices, in particular, to task learning based on a command for a first application, and applying the command to a second application based on the task.

BACKGROUND

Personal Assistants (PAs) and smart agents are present across mobile devices, television devices, home speakers, consumer electronics, etc. to carry out user tasks on multimodal devices. In mobile devices, the PAs and smart agents mostly work with one or more applications (apps) to perform specific tasks on user requests either with voice commands, shortcut buttons or gestures. For example, a task may be associated with user requests such as "Adding a Calendar Event," "Sending a Message," "Booking Tickets," "Booking a ride," etc.

SUMMARY

One or more embodiments generally relate to task learning based on a command for a first application, and applying the command to a second application based on the task. In one embodiment, a method includes receiving, at an electronic device, a command directed to a first application operated by the electronic device. Features presented by the first application in response to interactions with the first application are captured at the electronic device. Data communicated with the first application via the interactions with the first application are captured at the electronic device. A task is learned based on the captured features and communicated data.

In some embodiments, an electronic device includes a memory storing instructions. At least one processor executes the instructions including a process configured to: receive at the electronic device, a command directed to a first application operated by the electronic device; capture, at the electronic device, a plurality of features presented by the first application in response to interactions with the first application; capture, at the electronic device, data communicated with the first application via the interactions with the first application; and learn a task based on the captured plurality of features and communicated data.

In one or more embodiments, a non-transitory processor-readable medium that includes a program that when executed by a processor performing a method that includes receiving, at an electronic device, a command directed to a first application operated by the electronic device. Features presented by the first application in response to interactions with the first application are captured at the electronic device. Data communicated with the first application via the interactions with the first application are captured at the electronic device. A task is learned based on the captured features and communicated data.

In some embodiments, an electronic device including a memory storing instructions; and at least one processor executing the instructions, the at least one processor configured to: receive, at the electronic device, a command directed to a first application operated by the electronic device; capture, at the electronic device, interactions with the first application; and extract, from the interactions with the first application, slot type and slot value for understanding of the command.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 16 is a high-level block diagram showing an information processing system comprising a computing system implementing one or more embodiments.

DETAILED DESCRIPTION

Figure 1:
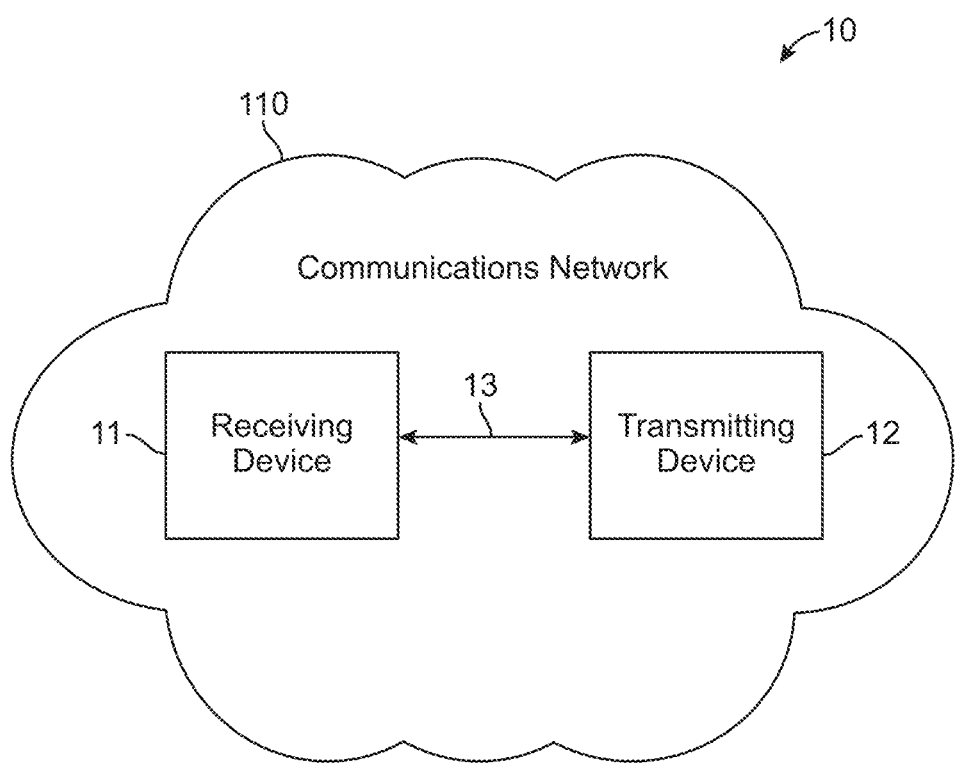
FIG. 1 shows a schematic view of a communications system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

It should be noted that the terms "at least one of" refers to one or more than one of the elements that follow. For example, "at least one of a, b, c, or a combination thereof" may be interpreted as "a," "b," or "c" individually; or as "a" and "b" together in combination, as "b" and "c" together in combination; as "a" and "c" together in combination; or as "a," "b" and "c" together in combination.

One or more embodiments generally relate to task learning based on a command for a first application, and applying the command to the first application again and/or a second application, based on the learned task. Some embodiments provide intelligent task learning and adaptive execution system processing including use of a generated bytecode task using an intelligent learning system (ILS) as described in U.S. Ser. No. 16/370,411 filed on Mar. 29, 2019, which is incorporated by reference in its entirety. In some embodiments, a method includes receiving, at an electronic device, a command directed to a first application operated by the electronic device. Features including visual features presented by the first application in response to interactions with the first application are captured at the electronic device. Data communicated with the first application via the interactions with the first application are captured at the electronic device. A task is learned based on the captured features and communicated data. In some embodiments, the command is applied to a second application based on the learned task.

In some embodiments, a semantic intelligent task learning and adaptive execution system (STaLES) (e.g., STaLES 300, FIG. 3) includes artificial intelligence (AI) processing that can learn performing various tasks from different application sources such as ticket booking, personal communication, business search, sharing on social network etc. For example, 'a ticket booking task' is learned on a travel application (e.g., EXPEDIA®), and the task learning knowledge can be used to perform the task on the same application repeatedly. If the user using other travel applications, such as TRAVELOCITY®, PRICELINE®, ORBITZ®, etc., STALES may apply the knowledge which is learned from EXPEDIA®, to perform the task on these applications also. STaLES learns how to perform a task from one application and re-execute/perform the learned tasks cross applications with different input parameters. In some embodiments, the system learns from various data elements such as natural language, events, visual data, etc. Events include device responses generated based on user actions; system events such as announcements, warnings; hardware state change events such as Wi-Fi connection change etc.; service events of other applications that are running in the background; and out of context events of learning application, etc. For example, a user may use a first travel application by demonstrating selection of date of departure, date of return, place of departure, place of destination, etc. The use of the first travel application by a user involves text entries, button selections, drop down menus, etc. The demonstration use of the first travel application may be used as information for a second travel application, even though the method of entering or selecting data is different between the two travel applications.

For applications to support tasks via personal (or virtual) assistants, such tasks must be implemented on every applicable application explicitly. For example, a task based on the utterance of "book the flight tickets" is one that should execute on multiple applications such as EXPEDIA®, KAYAK®, PRICELINE®, BOOKING®, etc. However, users may have installed different apps/applications on their electronic devices (e.g., electronic devices 120, FIG. 2). To carry out the task for all users, developers conventionally would implement, for each individual app/application, a specific application programming interface (API). To reduce the redundancy and implementation efforts on multiple applications, one or more embodiments provide intelligent systems that work effectively by learning one task from one app/application and executing or performing on many other related apps/applications. STaLES effectively takes all the inputs from user interface (UI) actions, events, natural language and visual elements for semantic understanding.

In one or more embodiments, STaLES intelligently identifies the task, learns and performs across related apps/applications with minimal (model) training. STaLES identifies multiple parameters of the task and effectively understands and carries out tasks with high accuracy. In some embodiments, the STaLES provides the following: the learned tasks are executed on the source app/application where the task initially learned; semantic task execution is provided from visual elements, text, icons and actions; STaLES provides dynamic application adaptation when executing the learned task on a target app/application that is different from the source application, and it selects each element (e.g., text, selections, buttons, drop down menu items, etc.) dynamically that is semantically similar to the original task on the original app/application; a one-time learned task can be executed on multiple applications in various dynamic states, context screens, etc.; STaLES provides consistent performance and accuracy by using user feedback upon task execution; STaLES provides task identification and recommendation after tasks are executed across various apps/applications; and STaLES provides a multi-app/application, multi-device and multi-platform modeling system that executes a learned task on other apps/applications that are semantically classified into a same category. In one embodiment, task identification is performed based on input values, application domains, number of actions performed in task execution, etc. In one embodiment, an application domain classifier identifies suitable target applications to execute the task on multiple applications.

States of an application may be determined based on the current UI and/or activity of the application that loads from various conditions. If an application was not executing in the background (e.g., background state), it starts as a new application process that determines a default state of the application. If the user worked with the application before executing a task and the application remained in the background, it starts from 'activity saved instance' or 'persistent state,' and restarts from where the user stopped. In some applications such as FACEBOOK®, TWITTER®, LINKEDIN®, etc., the UI elements change based on user action(s). For example, when a user scrolls down on a UI, new content is rendered. Therefore, it helps to identify the dynamic UI elements, which are changing frequently based on user actions. Events such as 'Window content changed,' 'Window state changed,' 'Windows changed' and 'onActivitySaveInstanceState' are also important to identify the application state.

FIG. 1 is a schematic view of a communications system 10, in accordance with one or more embodiments. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a) BLACKBERRY®. Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to devices including a voice assistant (personal assistant, virtual assistant, etc.) such as mobile telephone devices, television (TV) systems, smart TV systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., data and control messaging, e-mails, text messages, media messages), video communication, or combinations of these (e.g., video conferences).

Figure 2:
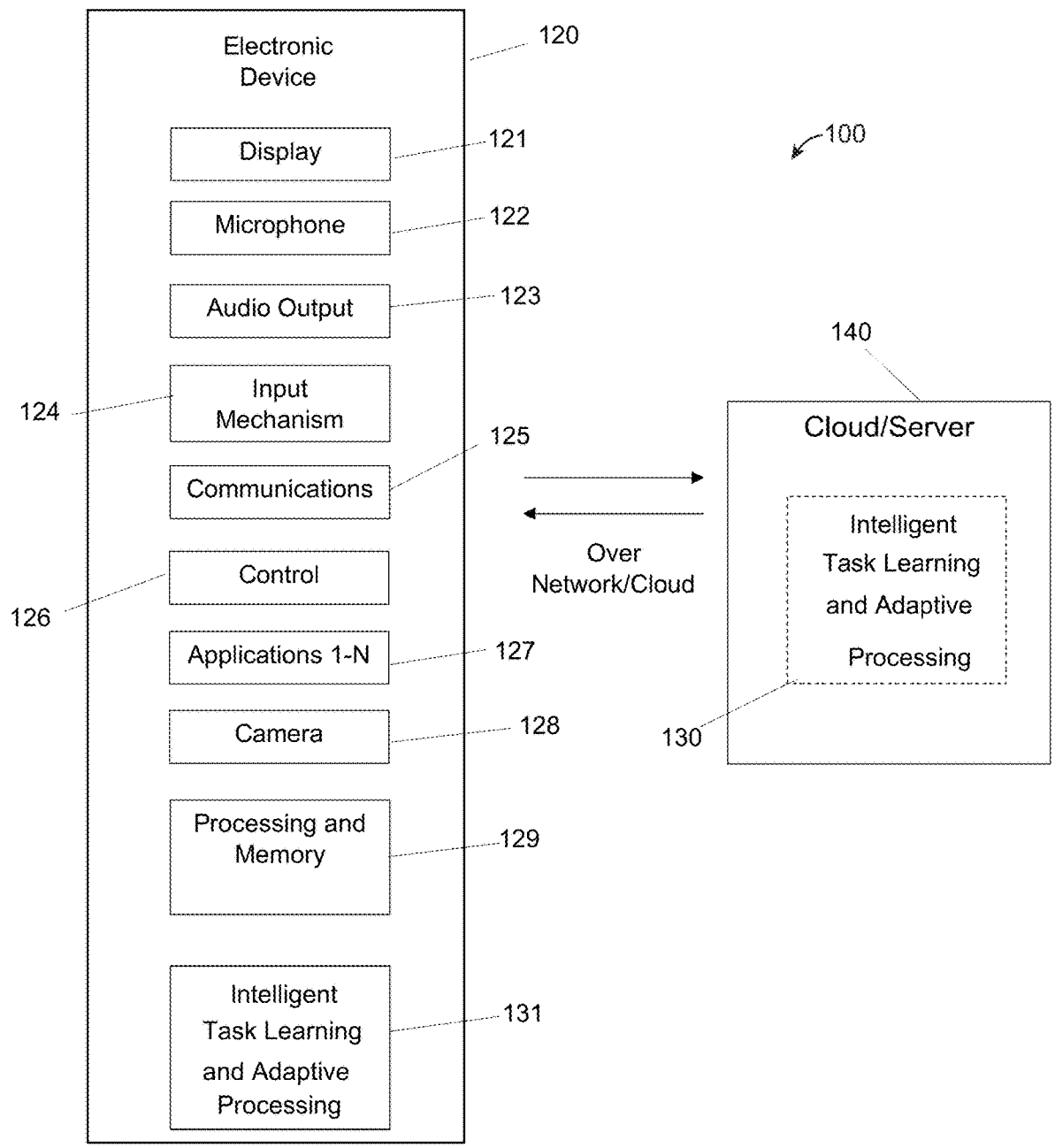
FIG. 2 shows a block diagram of architecture for a system including an electronic device and a cloud or server environment, that is capable of performing individually or in combination, intelligent task learning and adaptive processing, according to some embodiments.

FIG. 2 shows a block diagram of an architecture for a system 100 that is capable of performing intelligent task learning and adaptive processing for a virtual assistant or smart agent using user demonstration for at least one application using an electronic device 120 (e.g., mobile telephone devices, TV systems, cameras, camcorders, a device with audio video capabilities, tablets, pad devices, wearable devices, smart appliances, smart picture frames, smart lighting, etc.), a cloud or server 140, or a combination of the electronic device 120 and the cloud computing (e.g., shared pools of configurable computing system resources and higher-level services, etc.) or server (e.g., a computer, device, or program that manages network resources, etc.) 140. Both the transmitting device 12 (FIG. 1) and receiving device 11 may include some or all of the features of the electronics device 120. In some embodiments, the electronic device 120 may comprise a display 121, a microphone 122, an audio output 123, an input mechanism 124, communications circuitry 125, control circuitry 126, a camera 128, processing and memory 129, intelligent task learning and adaptive (e.g., using STaLES 300, FIG. 3) processing 130 and/or 131 (for processing on the electronic device 120, on the cloud/server 140, on a combination of the electronic device 120 and the cloud/server 140, communicating with the communications circuitry 125 to obtain/provide information thereof with the cloud or server 140; and may include any of the processing for, but not limited to, the examples as described below), and any other suitable components. Applications 1-N 127 are provided and may be obtained from a cloud or server 140, a communications network 110, (FIG. 1) etc., where N is a positive integer equal to or greater than 1.

In some embodiments, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In some embodiments, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In some embodiments, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In some embodiments, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, etc., a touch screen, gesture recognition, voice recognition, etc. The input mechanism 124 may include a multi-touch screen.

In some embodiments, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth® high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In some embodiments, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, one or more processors (e.g., in processing and memory 129) may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In some embodiments, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, PA (or smart agent) app, a map application, a media application (e.g., gallery app, QuickTime, Mobile Music app, or Mobile Video app), social networking applications (e.g., FACEBOOK®, INSTAGRAM®, TWITTER®, etc.), a calendaring application (e.g., a calendar for managing events, appointments, etc.), an Internet browsing application, a recommender application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In some embodiments, the camera module 128 comprises one or more camera devices that include functionality for capturing still and video images, editing functionality, communication interoperability for sending, sharing, etc. photos/videos, etc.

In some embodiments, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
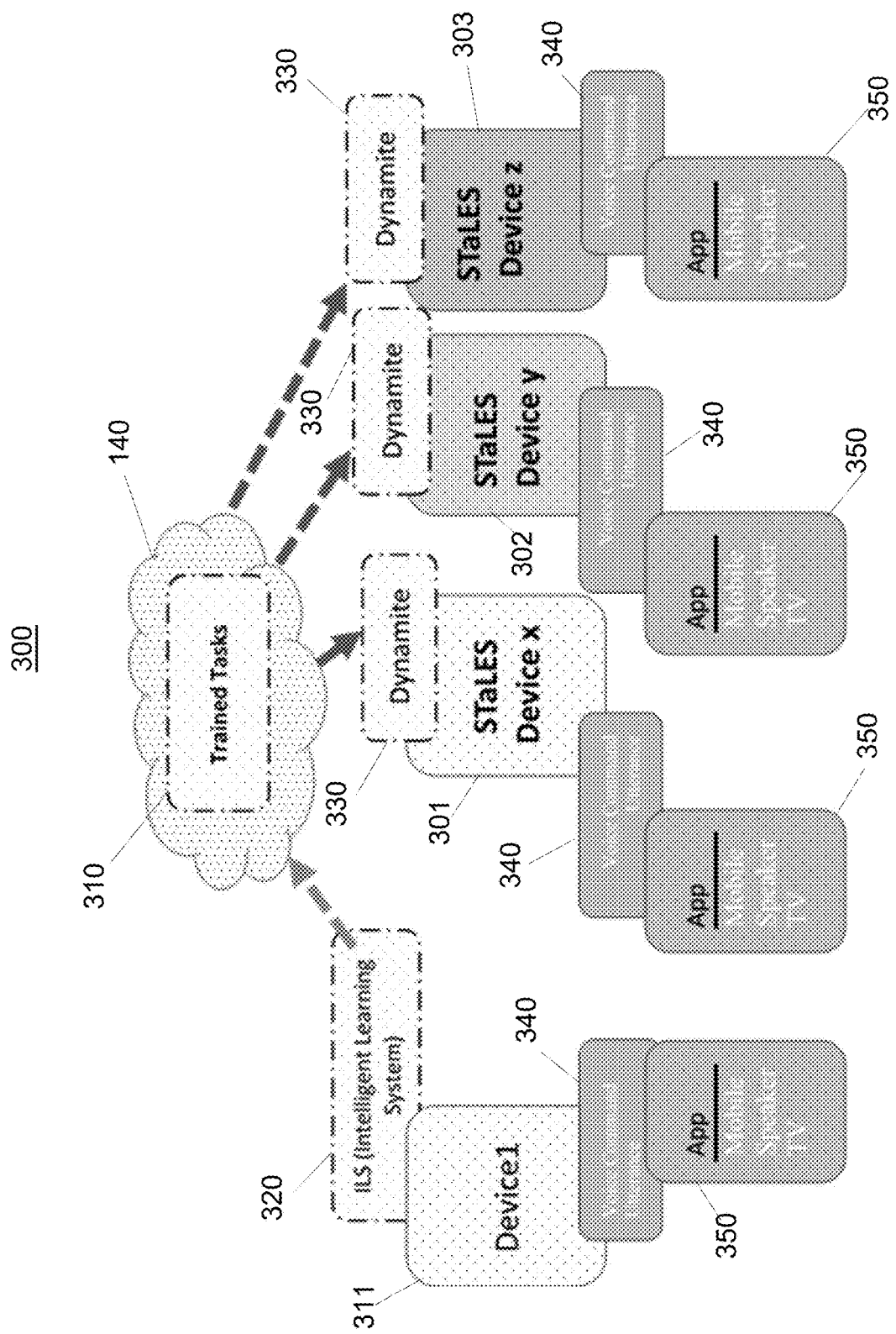
FIG. 3 shows a high-level block diagram for semantic intelligent task learning and adaptive execution system (STaLES) and operations thereof, according to some embodiments.

FIG. 3 shows a high-level block diagram for STaLES 300 and operations thereof, according to some embodiments. In some embodiments, the high-level block diagram for STaLES 300 and associated operations includes a first device (device 1 311, e.g., electronic device 120, FIG. 2), an app (or application) 350 (e.g., a mobile app, a speaker app, a TV app, etc.), voice command utterance 340 (e.g., an utterance directed to a PA, such as "book flight tickets," etc.), STaLES devices: x 301, y 302 and z 303 (e.g., electronic devices 120, FIG. 2 that executes STaLES processing), dynamic app adaption and interactive task execution (DynAmITE) processing 330. In one or more embodiments, an ILS service 320 is used for generating and providing bytecode tasks, and trained tasks 310 stored in the cloud/server 140 as described in U.S. Ser. No. 16/370,411 filed on Mar. 29, 2019, which is incorporated by reference in its entirety.

In some embodiments, STaLES 300 learns tasks automatically from user UI actions and events that are generated by the device 1 311. STaLES 300 is triggered when a user gives a voice command 340 to perform a task. The ILS 320 generates trained task 310 and stores it in cloud 140. For example, when the user gives a voice command as "create an event" and the system doesn't know how to perform the task, STaLES 300 invokes ILS 320 to learn the task. STaLES 300 learns from the various data of each user UI actions such as text, images, event status and UI elements, system events, context and state of the app/application (e.g., app(s) 350). In one or more embodiments, STaLES 300 can perform a learned task on other similar apps/applications when the task is only learned once. STaLES 300 improves the capabilities of the PAs in mobile devices to carry out wide ranges of tasks across the apps/applications of multiple domains with minimal training.

In some embodiments STaLES 300 can learn one specific task on any same or similar category application with the same semantic data. While performing task execution, the STaLES 300 artificially mimics human intelligence to identify the specific elements and signs/icons on each screen of the app/application. The same learned task can be executed on multiple versions (for example, software upgrade, etc.) of the single app/application. STaLES 300 works with DynAmITE processing 330 (see also FIG. 4) where different versions of the same app/application is able to execute the task. In some embodiments, STaLES 300 improves the accuracy and stability of the task execution based on user feedback. When STaLES 300 executes actions from the trained task, it can prompt user for feedback indicating whether any of the actions is correct. For example, STaLES 300 learned a task of "Send SMS" from one application with a send button labeled as "send." When performing the same task in a system with another application, the send button of that application is labeled with an icon image. STaLES 300 identified the possible send button to perform action "send," but before proceeding, it asks for user confirmation so that user feedback helps perform action with high accuracy. In one or more embodiments, if the task execution needed more input data, STaLES prompts for feedback or inputs from user. Based on multiple user inputs, STaLES is able to understand task nature, execution target application, thus provides great flexibility to STaLES 300 for continuous improvement. In one or more embodiments, when the user requests to execute a task using a voice command, if the target application does not exist to execute the task, STaLES 300 can identify the task sequence and target an available app/application based on a past utterances and past training knowledge. For example, in the past, a user task involved providing an utterance to a PA for booking flight tickets on a travel application (e.g., PRICELINE®). The user now provides an utterance for a task of booking tickets on TRAVELOCITY®, which is not supported by her device or system. The system may identify the task as one that carries out booking tickets using a travel application. Correspondingly, it uses past task sequence information, and selects an available alternative travel application (e.g., ORBITZ®) to execute the task.

In some embodiments, STaLES 300 learns a new task through voice input and human demonstration (e.g., touch, click, typing, gestures, etc.). STaLES 300 has few API interfaces to integrate with PA and Smart assistants, which take input as intent from the user to execute the task. In one or more embodiments, STaLES 300 can perform a task across a variety of apps/applications which belongs to same domain that are different from the source application. STaLES 300 enables to use the knowledge of one task to support many additional tasks in similar applications or tasks. For example, STaLES 300 learned a "send SMS" task, which needs two input parameters to carry out the task as 'contact' and 'text.' It can perform the same task on other applications supporting SMS functions. Along with those tasks, the knowledge can be shared to perform similar task of different applications like "post tweet," "share post on Facebook/LinkedIn," "send message on WhatsApp," etc. In all these cases, the task requires only two input parameters as 'contact' and 'text' to perform the task successfully.

Small tasks can be a small chunk of big task execution. STaLES 300 provides the capability of learning once, and applying the learned task in many places involving multi-devices, multi-system (Android™, Tizen™, etc.) and multi-user, which significantly reduces development effort and time, cost and resources to implement a specific task to support a PA's capability.

PA's fulfillment actions on applications can perform or automate a plurality of tasks when the user invokes commands by voice or text. Conventionally, these tasks are implemented statically on specific apps/applications. The user does not have an option to choose the execution sequence of the task. In some embodiments, STaLES 300 works on apps/applications where it learns sequences of user UI actions and can transform such into an executable or performable task on target apps/applications. The target applications may be the same app/application where the task was learned or similar apps/applications of the same category (e.g., travel apps/applications, restaurant apps/applications, transportation apps/applications, etc.). In one example, 'Booking flight tickets' is a task that can be completed on various apps/applications. STaLES 300 learns the task from one app/application to book tickets and the learned task can be executed on another flight ticket app/application on the same device or a different device.

In some embodiments, when the user starts demonstrating the task with UI interactions, each action the user performs is captured by STaLES 300, including one or more icon images, text(s) (displayed or input), etc., and type(s) of such elements. The type of element helps to identify and to predict the action that can be performed during the execution process. For example, when learning the task "find hotel" for "city" the type input slot value for the UI element was "edit text," therefore the user can input any value as city. When the task executes again it can perform input text value into 'edit text.' When the "find hotel" task executes on a different version or other device application for a same city slot value 'ListView' as the UI element where only specific cities can be selected by the user. Therefore, the only action that can be performed on the UI element is "select." The STaLES 300 can identify the action on the UI element while executing the task. STaLES 300 supports multi-modal GUIs with contextual understanding so that it understands interface variations of the same application running on different electronic devices such as Mobile, TV's, wearables, smart refrigerators, etc. of multiple form factors. For example, "searching a movie from Netflix" is different on a TV device than from a mobile device. Both carry out the same task execution, but in different environments and different GUIs. STaLES 300 recognizes the UI elements based on actions that can be performed, properties, and type of UI element. If the UI elements are different but share common functionality, STaLES 300 can categorize and predict appropriate elements even if the task is executing on a cross platform or device. Some of such GUIs can be highly complicated with hundreds of objects, each with many different properties, semantic meanings, and relationships with other objects.

Figure 4:
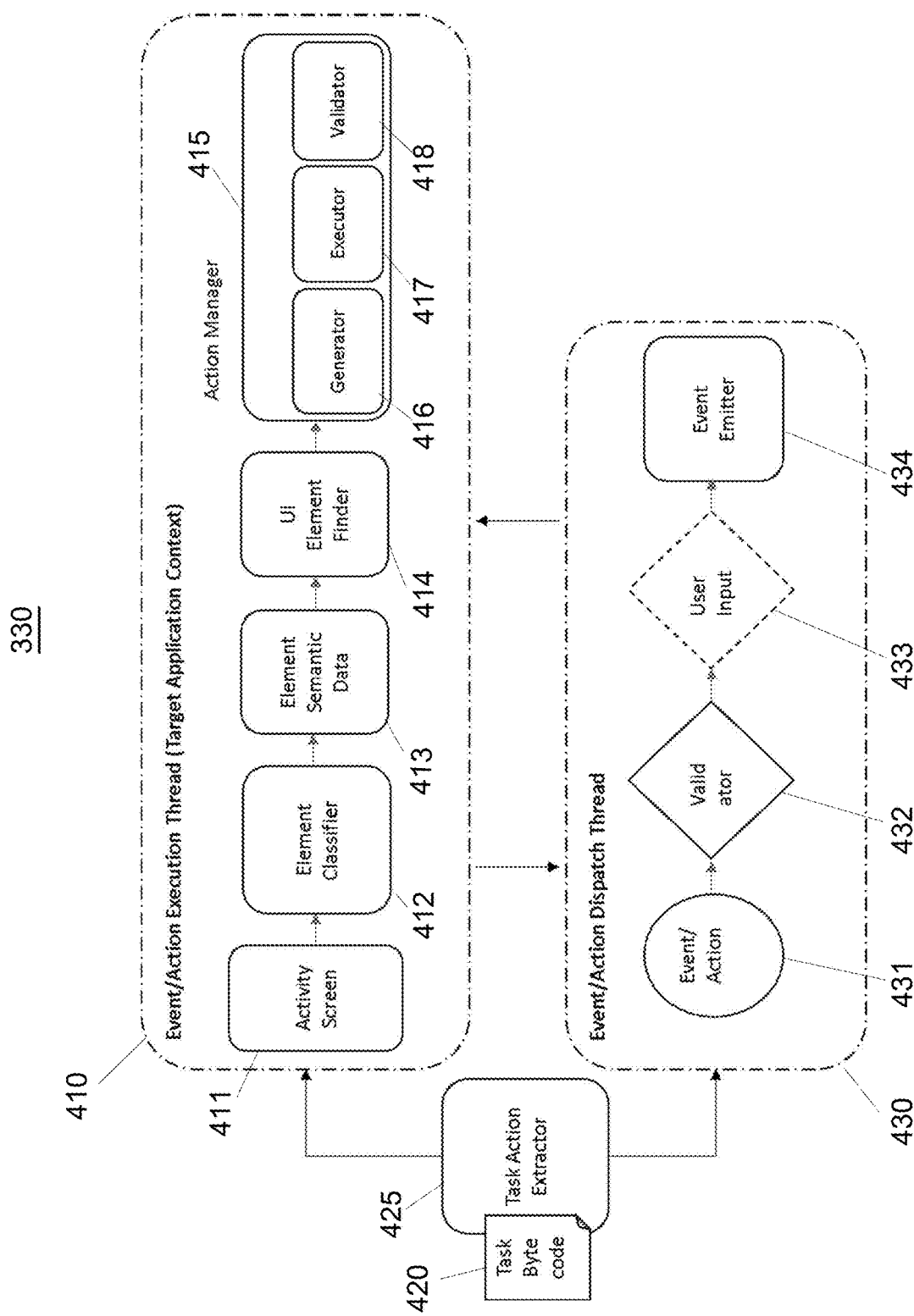
FIG. 4 shows a high-level flow for a dynamic app adaption and interactive task execution (DynAmITE) processing, according to some embodiments.

FIG. 4 shows a high-level flow for DynAmITE processing 330, according to some embodiments. DynAmITE processing 330 is a task executing process in the STaLES 300 where a task is executed on a target app/application. The target app/application may be a source app/application where the task was learned or a different app/application of a similar category. DynAmITE processing 330 understands each event and executes using app/application context with the highest possible accuracy. In one or more embodiments, DynAmITE processing 330 is designed with context in mind to work with a target app/application when executing an action as part of the task. In some embodiments, DynAmITE processing 330 may include two real-time service threads: one thread is the event or action execution thread 410, running in target application execution context which means to perform the actions on the target application. Event execution thread 410 runs in the memory context of the target application, and the other is the event dispatch thread 430, running in a STaLES context. When the task bytecode 420 is input to the task action extractor 425, which is a protobuf (Protocol Buffer) file reader to read the semantic events of the task, in one embodiment, the semantic events are input to the event execution thread 410 and the event dispatch thread 430.

In one or more embodiments, the event execution thread 410, in target application context, includes activity screen 411 that is a current UI activity screen where each event/action should execute, an element classifier 412 that is a UI element classifier that contains an icon/image and text classifier that classifies each element present in the activity screen 411 and generates element semantic data 413 of all UI elements. The UI element finder 414 searches event and/or action dispatched from the event/action dispatch thread 430 to perform the action on a specific UI element. The action manager 415, which includes generator 416, executor 417 and validator 418, performs the action on one or more UI elements. The generator 416 generates a specific action which is equivalent to an event/action dispatched from the Event/action dispatch thread 430 such as a click of a mouse or cursor, a long click of a mouse or cursor, select or swipe on a UI element, etc. The executor 417 executes the action on an element and the validator 418 validates based on the response from the system after performing the action. For example, when a 'Button Click' action is performed by the executor 417, the system generates a response event 'BUTTON_CLICKED,' which validates the action by the validator 418. The event/action dispatch thread 430 includes the event or action 431, which is extracted from the task bytecode 420. Each action is dispatched to the Event/action execution thread 410, where the validator 432 validates the type of the event or an action such as a button selection, an input UI element, etc. The optional user input 433 and the event emitter 434 only generates or provides prompts when the UI element is an input type where the user needs to input data to execute the task.

In some embodiments, the DynAmITE processing 330 (FIG. 3) executes by first launching the task from an available task list, such as the trained tasks 310 (e.g., from the cloud 140, FIG. 3, or from a device, such as device 1, 311, FIG. 3), that includes classified tasks. The activity screen 411 may include a UI screen of the electronic device (e.g., device 1 311, FIG. 3) being used for a task. The element semantic data 413 is an equivalent classification value of text and image used to determine the UI element generic meaning of understanding based on the icon or text. For example a "send button" can be shown on the application screen activity as "send" text or an icon representation for "send." In both the cases STaLES 300 (FIG. 3) has to determine the generic meaning from both values. The UI element finder 414 determines the appropriate element to execute the current command (e.g., voice command utterance 340, FIG. 3). The event dispatch thread 430 validates the event 431 with the validator 432 and generates (or obtains) a prompt for user input 433, which is data from the user entered via voice, keyboard, gesture, etc. The user input 433 provides feedback from the user in terms of task review before executing final command by the event emitter 434.

Figure 6A:
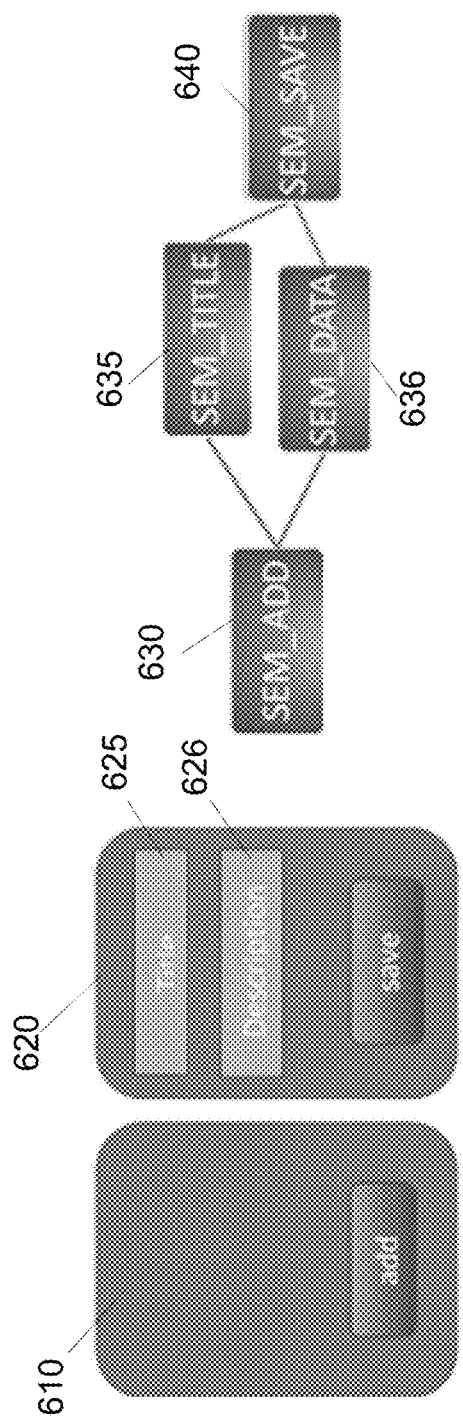
FIG. 6A shows example screen states and input data elements for a first version of a memo app/application, according to some embodiments.

In some embodiments, the event execution thread 410 executes a task in a restricted app/application context. In some embodiments, the event execution thread in app context 410 includes the UI element finder 414 that may be used to find corresponding UI element based on classified semantic data which is classified by the element semantic data 413 and the action manager 415 that performs an action on specific UI elements. The action manager 415 collects feedback of each performed event. When an event is received from the event dispatch thread 430, the UI element finder 414 searches the specific UI element based on 'Resource Id' to perform the action. In Android™ systems each UI element which is placed on an activity screen 411, identified by the unique ID is termed as 'ResourceId.' The ResourceId is a unique string assigned to a UI element by an application developer and is accessible across the corresponding application. The UI element finder 414 performs a search of data in a generated UI element semantic data 413 generated and structured in a tree format to perform search operations effectively when needed to access (one example is illustrated in FIG. 6A). The event/action execution thread 410 receives an action from the event/action dispatch thread 430 to perform. The UI element finder 414 finds UI elements based on the 'semantic code of the UI element' that is a unique code which is categorized to identify the group of similar elements based on either text or image icon. If the activity screen 411 UI semantic data contains more than one element in the same category, the UI element finder 414 finds the UI element based on the description of the element. For example "send" and "tweet" are semantically in the same category, but both have different description UI elements that the UI element finder 414 finds based on unique semantic code, UI element category, element description, element coordinates in the screen, and actions that can perform on UI element.

In some embodiments, the element UI element finder 414 acts differently on various parameters to find the appropriate UI element. One example, case 1, may occur when the source (learned) app/application UI is not changed, that is, the task learning and executing occurs on the same application. Another example, case 2, can occur when the source app/application UI is not changed but the 'ResourceId' is not available or has changed. The 'ResourceId' is unique identifier of each UI element assigned by developer while developing the application. In case 2, if the app/application activity UI has not changed, but the ResourceId was not available (e.g., FACEBOOK® obfuscation) or the ResourceId has been changed (when learning a new task with highest precision, the UI element ResourceId was not available), the event/action execution thread (in target application context) 410 obtains the UI element by using the x, y coordinates of the UI element, from the element semantic data 413 of the UI activity of the app/application. In yet another example, case 3, the task is learned on one source app/application and the application UI has updated during task execution, the UI element finder 414 identifies the right element from the activity using semantic data unique semantic code for UI elements from a UI element semantic data 413.

In some embodiments, if no suitable UI element is found in the current activity screen 411, the UI element finder 414 identifies the suitable activity screen 411 based on available activities in the application. All the activities are declared in a manifesto file of an application. The manifesto file is a configuration file associated with the application where all permissions, activities, database and other resources are declared before being used in the application. The Screen State Changer 740 chooses the appropriate activity from a list of activities fetched from the manifesto file and loads it on a screen, based on task learning data that is related to activity data of the total activities that were participated in. The activity data includes a description of the activity, total number of UI elements, types of elements, whether the activity has participated in the task learning process, etc. To identify the correct activity screen 411 from available activities, the UI element finder 414 uses parameters such as 'total UI elements of the activity,' 'type of the activity screen from activity description,' metadata of the activity screen which is added by the developer of the application in a manifesto file. In one embodiment, the DynAmITE processing 330 works with logic referred to as 'Right Activity-Right Element' that determines the best possible activity and selects the UI element to perform the task precisely and correctly. When launching an application with a persistence state, which is restoring the application from the last closed state by the user, the application will restore in next launch from the saved state where it was closed. Therefore, if the application launched from the persistence state, the DynAmITE processing 330 follows the approach 'Right Activity—Right Element' to identify the source activity screen 411 and the correct element to perform the action as a part of the task execution. In one or more embodiments, the activity recognition code is a unique identifier generated by the generator 416 to identify the activity from a list of available activities of the application. If the target activity does not change from the learning activity, the target activity can be found with the UI element using the ResourceId. For some embodiments, example cases are described below where the search might find an incorrect activity using the UI element finder 414 for finding the element to perform the action.

Figure 5:
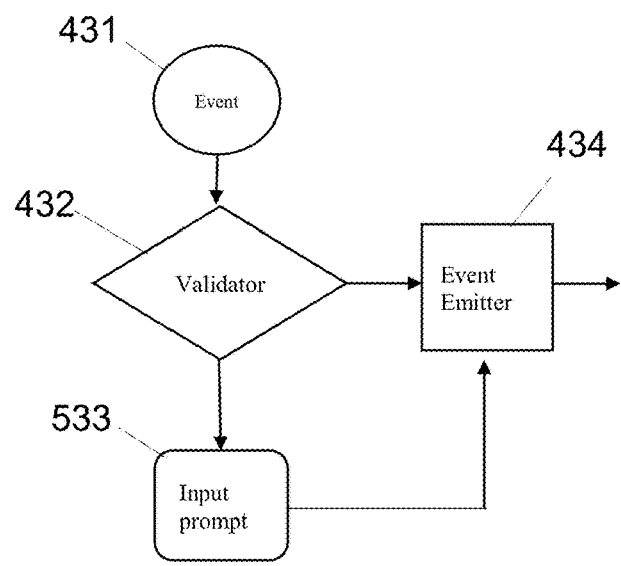
FIG. 5 shows a high-level flow for STaLES execution block diagram, according some embodiments.

FIG. 5 shows a high-level flow for the event dispatch thread 430, according to some embodiments. In some embodiments, the event dispatch thread 430 dispatches each event 431 from a task queue after validation of the event by the validator 432. The validator 432 validates the event 431 with semantic data for UI element and UI element classes. The STaLES 300 processing (FIG. 3) has a pre-defined full list of UI elements class data to validate the UI element an to perform the action. Each event 431 is classified according to the type of the UI element to perform a specific action. The UI element for EditText, OptionButton, ListView, DropdownListView types needs to be input to select a desired value from the user input (either using voice or keyboard entry). These UI elements accept the values from the user to successfully complete the task. These UI elements are filled or selected with user specific values that are obtained either from a user utterance or prompts dynamically issued to the user by the event/action dispatch thread 430 (FIG. 4) with an input prompt 533. After successful input, the event 431 is emitted by the event emitter 434 to the event/action execution thread in application context 410 (FIG. 4) where the action is performed with the app/application context.

FIG. 6A shows example screen states and input data elements for a first version of a memo app/application, according to some embodiments. The first version of the example memo app/application includes two screens and two UI elements which accepts input values as Title and description and two action UI elements "add" and "save" for creating a new memo (e.g., a text memo or note, an audio memo or note, etc.). The first screen 610 includes a UI "add" button. The second screen 620 includes the title 625 UI entry, description 626 UI entry and a UI save button. In some embodiments, the STaLES 300 processing classifies or recognizes the UI semantic elements using the element classifier 412 (FIG. 4) of the app/application. A UI element semantic data structure in a tree is generated by the element semantic data 413 (FIG. 4). The generated semantic UI elements data is shown in FIG. 6A as the elements SEM_ADD 630, SEM_TITLE 635, SEM_DATA 636 and SEM_SAVE 640. The UI semantic element data for the add button in screen 610 is SEM_ADD 630. The UI semantic element data for the title 625 UI entry in screen 620 is SEM_TITLE 635. The UI semantic element data for the description 626 UI entry in screen 620 is SEM_DATA 636. The UI semantic element data for the UI save button in screen 620 is SEM_SAVE 640.

Figure 6B:
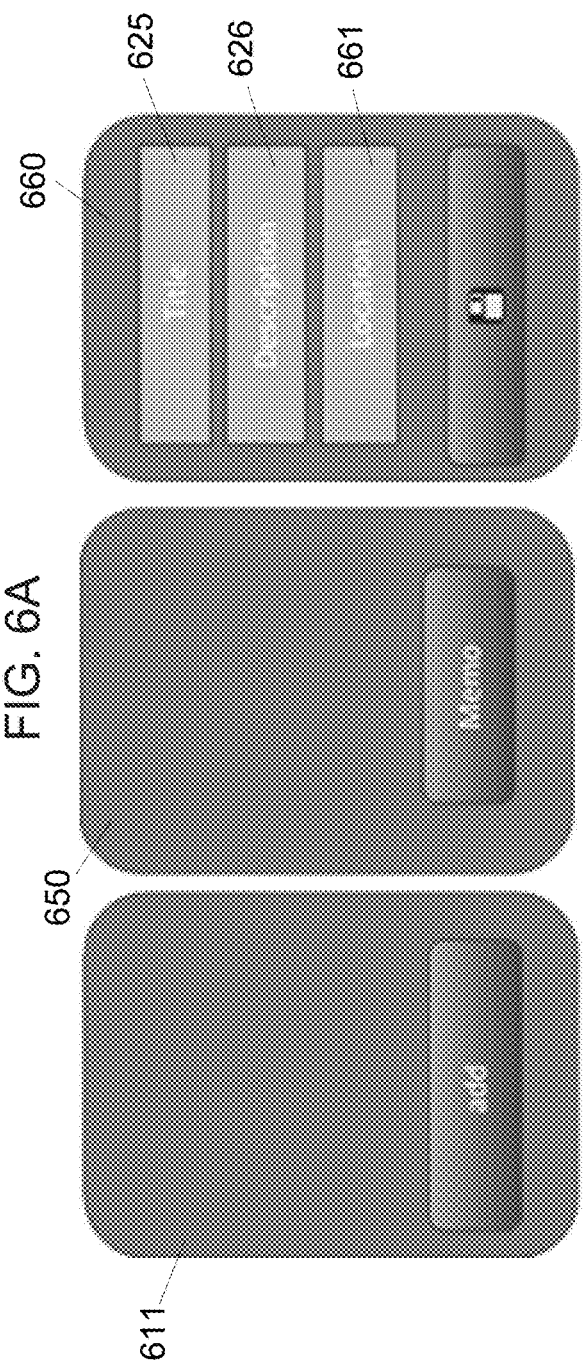
FIG. 6B shows example screen states for a second version of a memo app/application, according to some embodiments.

FIG. 6B shows example screen states for a second version of a memo app/application, according to some embodiments. The second version of the example memo app/application includes three screen states and three UI elements which accepts input values and three UI elements which perform actions such as a mouse or cursor "click." The screen 611 includes the same UI add button as in the first version of the memo app/application. The screen 650 is different from the first version and includes the UI memo button to start the next UI screen 660. The screen 660 includes the UI title entry 625, the UI description entry 626, the addition of a UI location entry 661, and a UI "save" button with an icon, instead of the word "save" as in the first version of the app/application. In some embodiments, the UI element finder 414 finds the semantic elements from the generated tree and uses these semantic elements for the similar UI elements for the second version of the app/application. The UI element tree is generated based on three major parameters, text, icon and image type of the UI element. The text classifier 701 generates the semantic code for the same related key words that the text classifier 701 was trained on. For example, 'send,' 'post,' 'dispatch,' and 'write' are all used semantically for the same purpose for an action in similar applications such as SMS, FACEBOOK,® LINKEDIN®, and other social media apps. The icon classifier 702 trains on multiple (~4000) icon images that are collected from multiple applications of the mobile device. A same send action across the applications use various icon images for understanding by the user. Either text, image or both semantically share the same meaning. The type of the UI element which is unique to perform a specific action such as the send action only uses a button as UI element. To place a button action in an application developers use UI elements such as ImageButton, TextView, and Button. All the UI elements share similar properties to perform the button action. When an action needs to be performed on the active screen, the UI element finder 414 searches for the same UI element which is similar in all properties from the semantic data.

Figure 7:
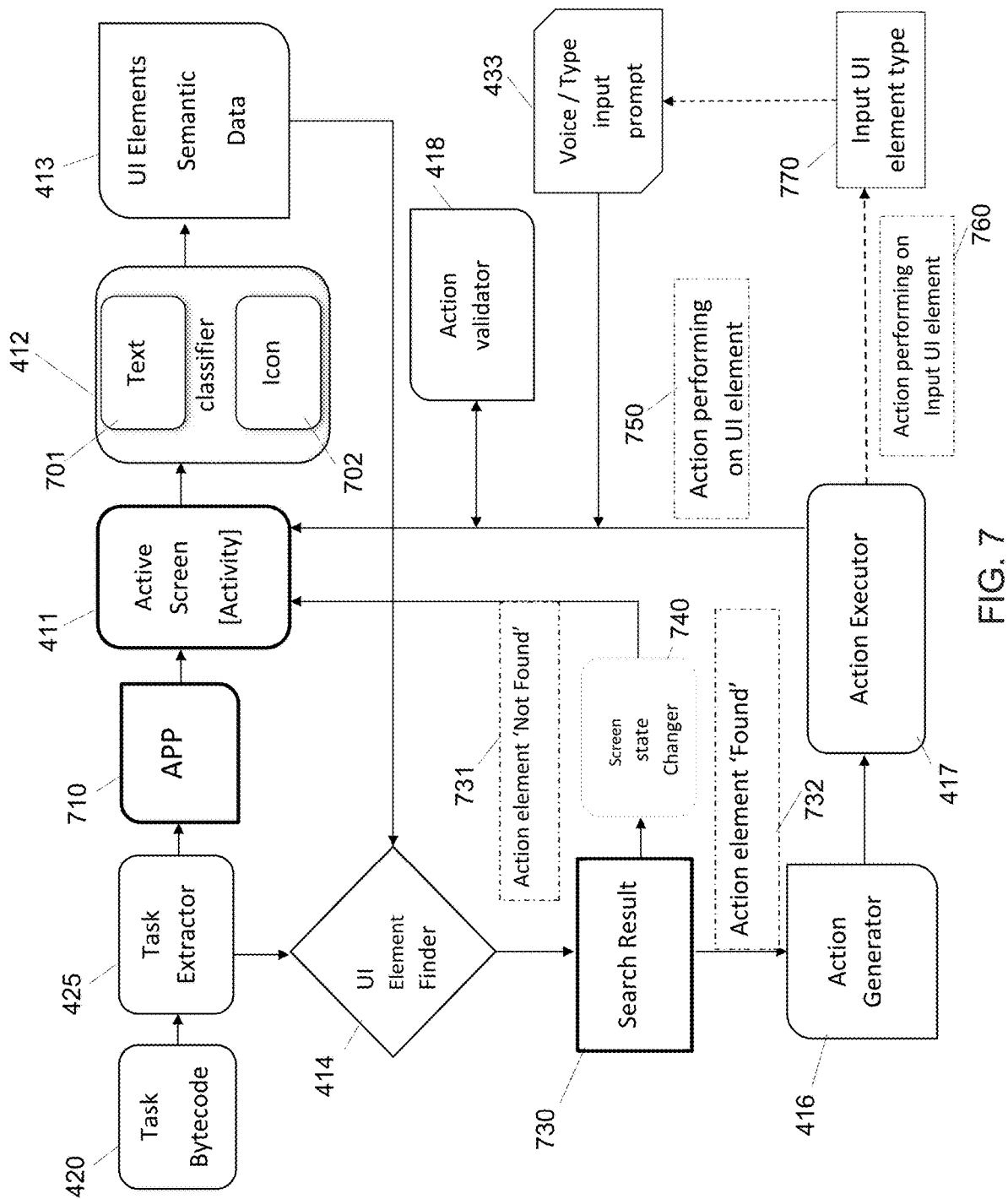
FIG. 7 shows a flow diagram of an event/action execution thread, according to some embodiments.

FIG. 7 shows a flow diagram of an event/action execution thread 410 according to some embodiments. In some embodiments the task bytecode 420 is used for extracting task data along with application package data on which the target application 710 needs to perform the task. The task extractor 425 launches the target application 710 to memory with an active screen(activity) 411. The (element) classifier 412 classifies each UI element either visible to a user on the active screen 411 or not that is based on the UI element data text, icon image, description and type of element. The classifier 412 includes a text classifier 701 and an icon classifier 702. The classifier 412 generates UI elements semantic data 413 of the active screen 411. When an execution thread receives an action from the task bytecode 420 to perform on the screen, the specific action UI element has to be found from the active screen 411 UI elements semantic data 413.

In some embodiments, the UI element finder 414 performs a search operation to find a semantically equivalent UI element to perform the current action in the task bytecode 420. The UI element finder 414 outputs the search result 730 as either 'action UI element found' 732 that is semantically equal to the action from the task bytecode 420 or 'action element not found' 731. If the search result was not found 732, the action generator 416 generates the action to perform on the UI element. The action generator 416 generates the appropriate action based on the data available for from task bytecode 420. The actions may include UI actions, such as a click, a long click, a swipe, a selection, etc. For example, if the action was an "event_scroll" and the direction was up, the action generator 416 generates a "swipe_gesture" action and the direction is bottom to top (of the UI). The action generator 416 provides the action to the 'action executor' 417 for action performing on the input UI element 760 for the current active screen 411 on an appropriate input UI element type 770. The action validator 418 validates the action and the UI element when the task is executing on a different version of an app 710 (other than the learned version). The action validator 418 provides a prompt (voice/type input prompt 433) to a user for feedback before proceeding to perform the action (action performing on UI element 750). To ensure that the action is executed, the action validator 418 validates the feedback event after performing the action (action performing on input UI element 760), which is generated by the system automatically. If the action executor 417 performs the action performing on UI element 750 such as ListView, Edit Text, Calendar, etc., every task execution needs an input value to complete the task, which was obtained from the user either using voice or text by the voice/type input prompt 433. If the search result 730 produces a result as 'action element not found' 731, the current active screen 411 does not have the appropriate semantic UI element to perform the action and is input to the screen state changer 740 to change the current active screen 411 of the app 710. The current active screen 411 data is available from the task bytecode 420 while learning the task. When the screen state changes the process will repeat from the classifier 412 to the UI elements semantics data 413 and a semantic data search is performed on the new screen, etc.

Figure 8A:
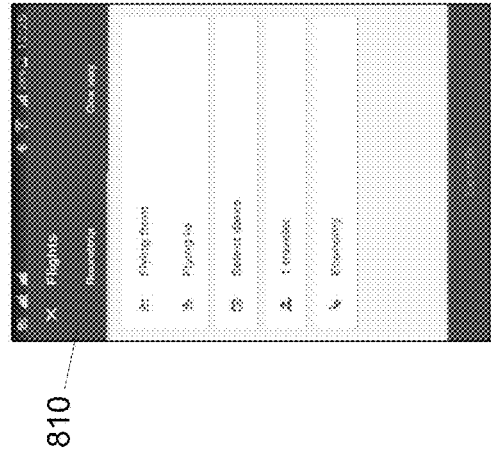
FIGS. 8A-C shows example screens for an EXPEDIA® app for illustration of learning a task including searching for flights.
Figure 8B:
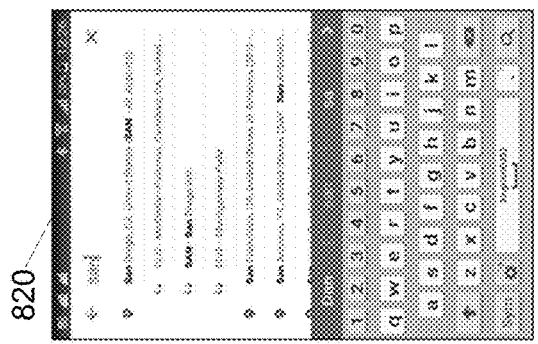
Figure 8C:
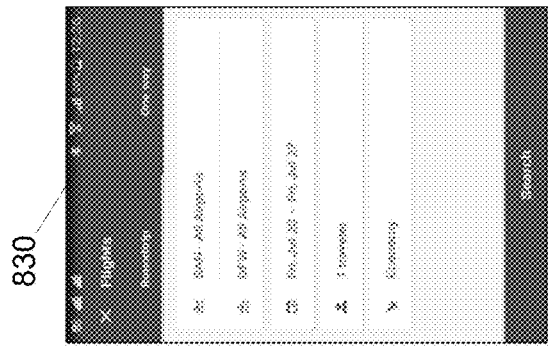

FIGS. 8A-C show example screens 810, 820 and 830 for an EXPEDIA® app for illustration of learning a task including searching for flights. In this example, the STaLES 300 processing (FIG. 3) learns the task (of booking or viewing available flight tickets) from the EXPEDIA® application from user demonstrations. The STaLES 300 processing will execute the same task on the PRICELINE® app with different input parameters.

Figure 9A:
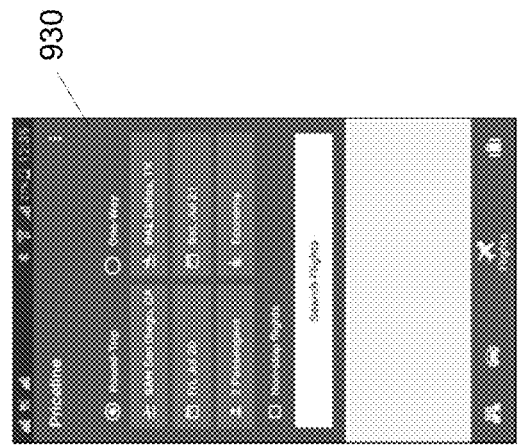
FIGS. 9A-C shows example screens for a PRICELINE® app for using a learned task for searching for flights, according to some embodiments.
Figure 9B:
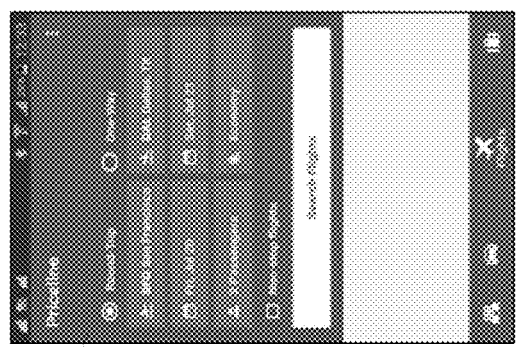
Figure 9C:
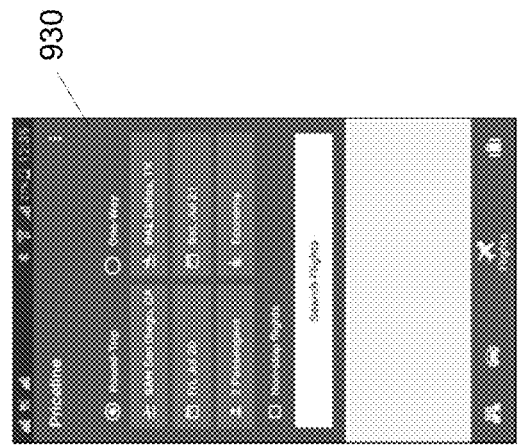

FIGS. 9A-C shows example screens 910, 920 and 930 for a PRICELINE® app for using a learned task for searching for flights, according to some embodiments. The STaLES 300 processing execute the same task learnt from EXPEDIA® app on the PRICELINE® app/application using the semantic UI elements obtained from the learning, and such UI elements from EXPEDIA® app screens 810, 820, 830 (FIGS. 8A-C) are input to the PRICELINE® app screens 910 and 920 to result in screen 930.

Figure 10:
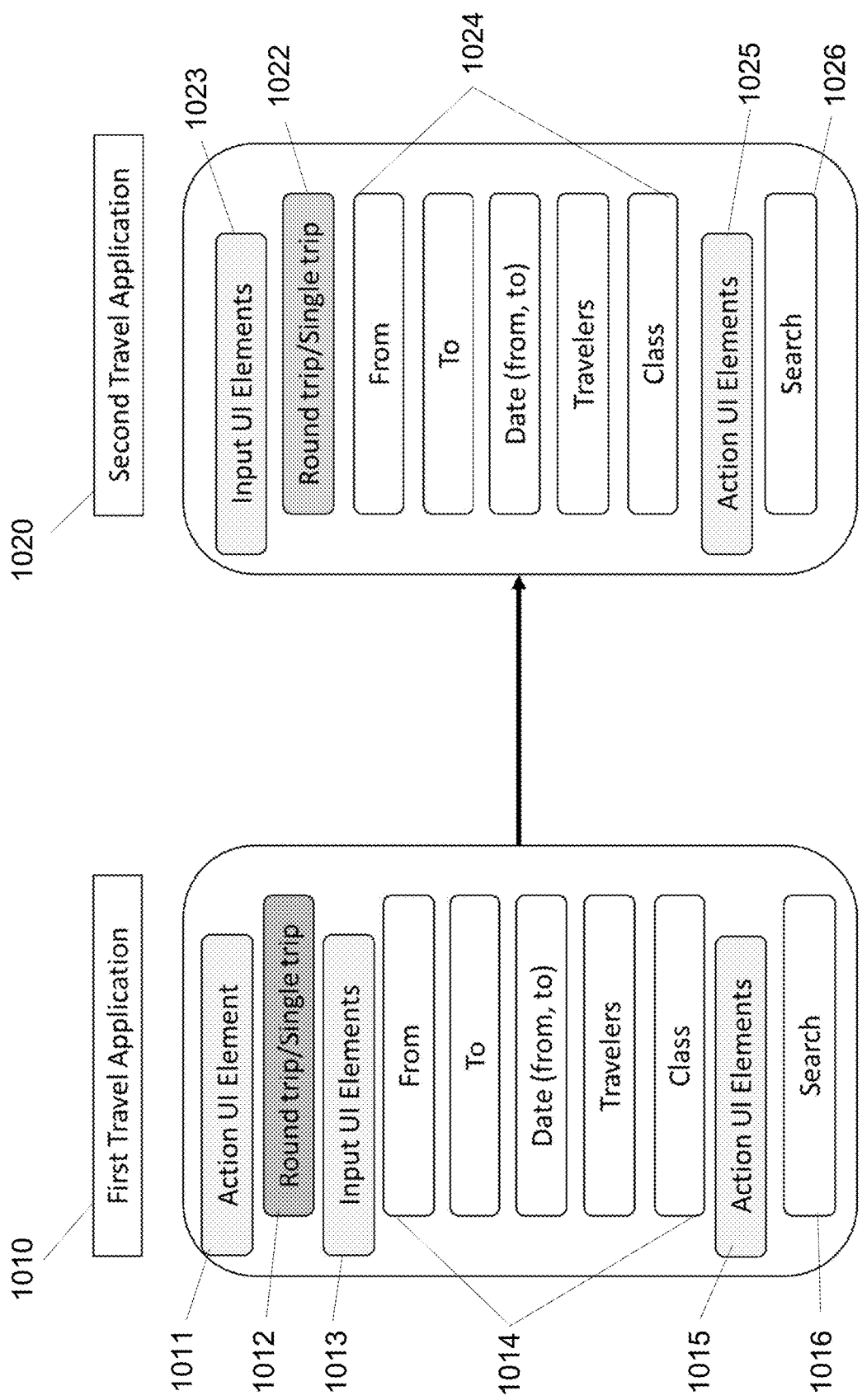
FIG. 10 shows an example for learning a task for a first travel application for use with a second travel application, according to some embodiments.

FIG. 10 shows an example for learning a task for a first travel application 1010 for use with a second travel application 1020, according to some embodiments. In the first travel application 1010 the user demonstrated the task "search flights" by using seven UI elements of multiple types: action UI element 1011 (round trip/single trip 1012), input UI elements 1013 (from, to, date (from, to), travelers and class 1014), and action UI elements 1015 (search 1016). STaLES 300 processing (FIG. 3) captured the metadata information such as type of UI element, semantic text or icon value, element UI coordinates from 'Round trip/single trip 1012, from, to, date, travelers, and class 1014, and action search 1016. In the first travel application 1010 screen the from "Round/Single Trip" 1012 value is learned as an "action element" due to the UI element 'button' being used to perform the action by the user.

The second travel application 1020 includes a screen having input UI elements 1023 (round trip/single trip 1022 including from, to, date (from, to), travelers and class 1024) and action UI elements 1025 (search 1026). When the same task "search flights" is executing on the second travel application 1020 the 'Round/Single trip" 1022 value is marked as an "option button" which treats as an input value that the STaLES 300 processing should perform the 'select' action on two option buttons on the screen of the second travel application 1020.

Conventionally, to enable a task in a personal assistant, expertise in NLU/NLP is needed, programming skills are required, and knowledge of use of an integrated development environment (IDE) tool is required. Some embodiments provide for eliminating these conventional requirements, and instead enable end users to teach a task to their PA. This makes the PA easily personalized and scalable to end users.

Figure 11:
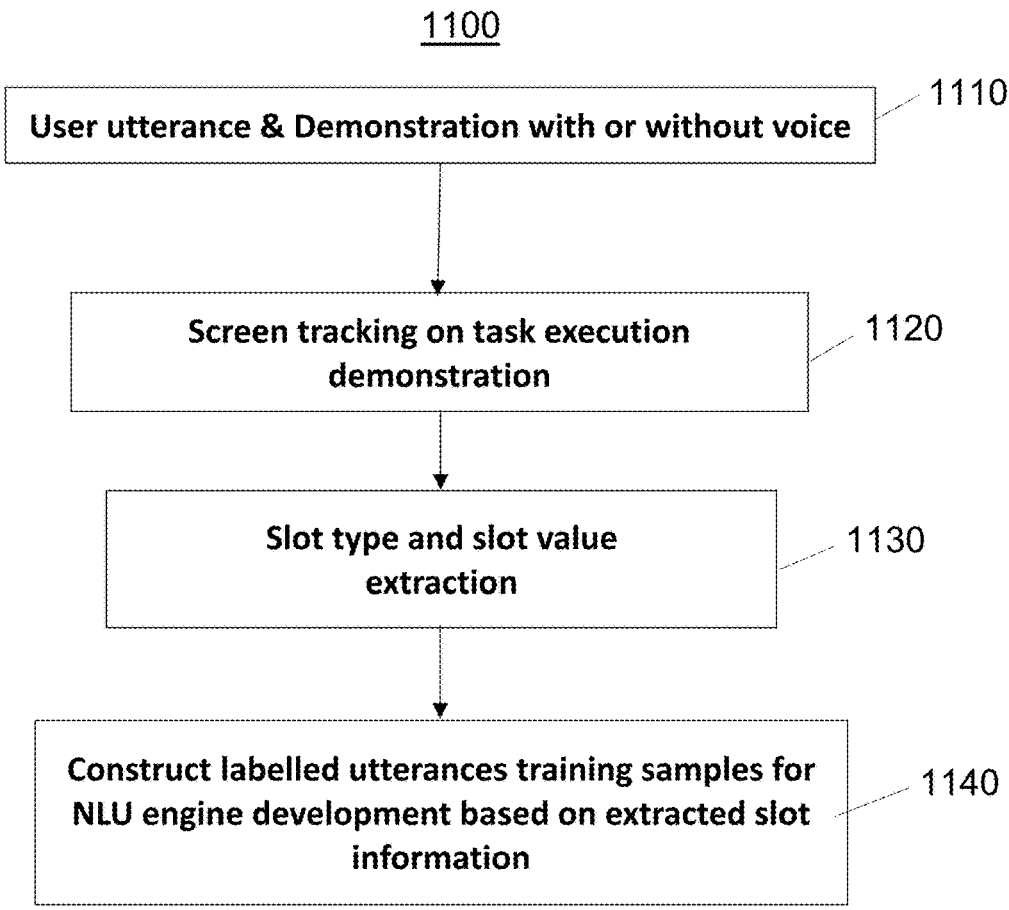
FIG. 11 shows a process flow diagram for user initiated natural language understanding (NLU) development for a new task via user demonstration, according to some embodiments.

FIG. 11 shows a process 1100 flow diagram for user initiated NLU development for a new task via user demonstration, according to some embodiments. In one or more embodiments, the process 1100 may be implemented with STaLES 300 (FIG. 3). In block 1110 a user may provide a natural utterance indicating a voice command for a new task, and then start teaching how to perform the new task on an electronic device (e.g., device 1 311, FIG. 3) through demonstration (with or without voice). Demonstration may include operations (e.g., clicks, typing inputs, etc.) on the electronic device's screen and optionally includes voice instruction in natural languages as well. In block 1120, process 1100 performs screen tracking on task execution demonstration. In one or more embodiments, STaLES 300 "watches" how the user performs the task. Process 1100 automatically identifies where and what the user demonstrates on the screen and maps the screen interactions to the words/phrases in the voice command utterance. In block 1130 process 1100 determines UI slot type and performs UI slot value extraction. The information that is extracted through process 1100 are "slot types" and sample "slot values." The user can demonstrate the task one or multiple times. With the extracted slot types and slot values as inputs, the user's utterance is converted into labeled utterances, which are provided to perform NL training. In block 1140, process 1100 constructs the labeled utterances as training samples for an NLU engine development based on the extracted slot information. After an NL engine is trained, next time when the user utters a same or semantically similar voice command, the NLU engine is able to understand the voice command in order to execute the task.

Figure 12:
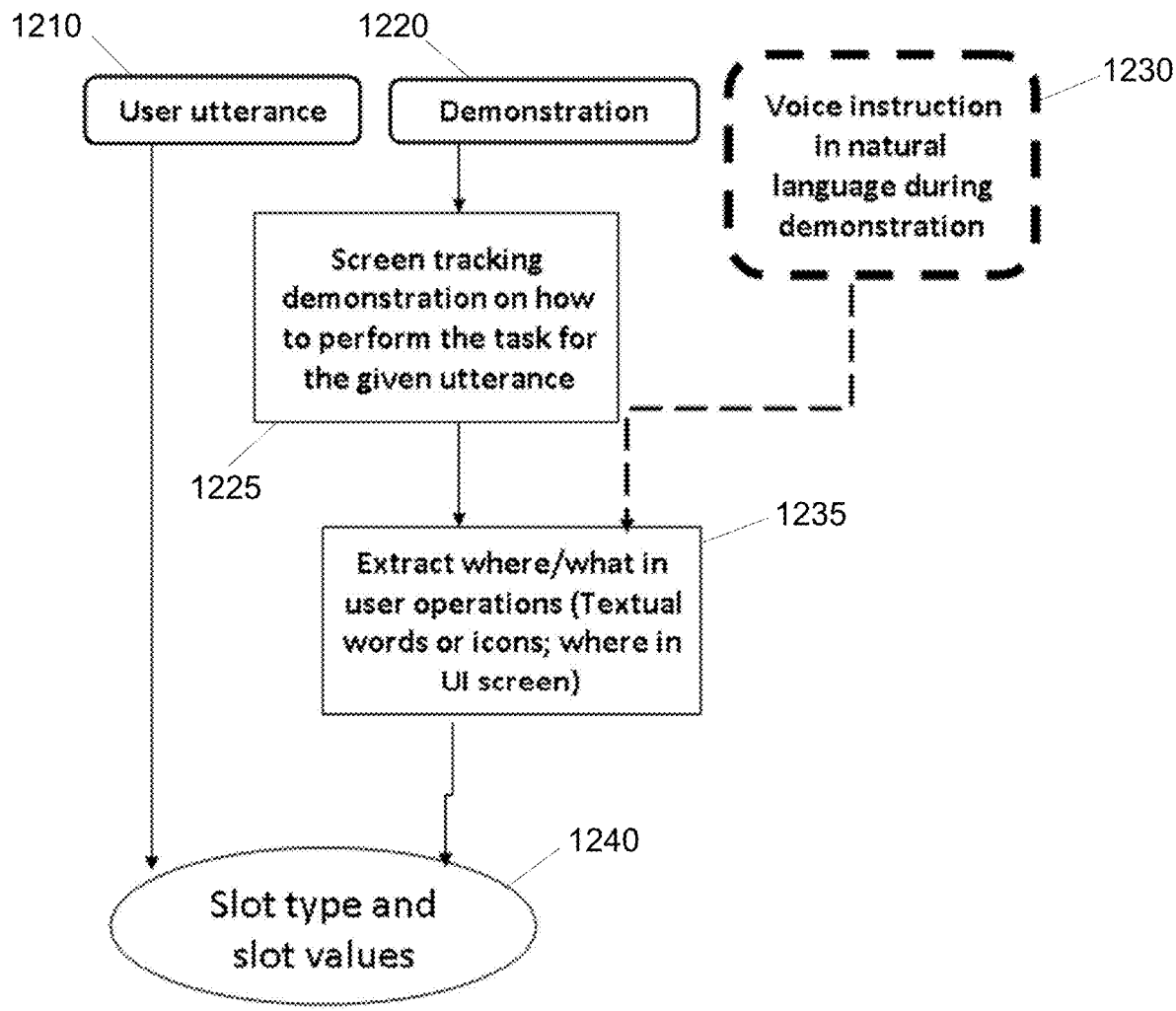
FIG. 12 shows a process flow diagram for slot type and slot value extraction from user teaching, according to some embodiments.

FIG. 12 shows a process flow diagram for slot type and slot value extraction (of process 1100, FIG. 11) from user teaching, according to some embodiments. In one or more embodiments, in block 1210 the user utterance (from block 1110, FIG. 11) is obtained. In block 1220 the user's demonstration (from block 1110, FIG. 11) is obtained. For slot type and slot value extraction from user teaching, the process 1100 may support user teaching without voice instructions or user teaching with voice instructions (i.e., block 1230). In some embodiments, in block 1225 the process 1100 provides screen tracking of demonstration on the task is performed in response to the user utterance in block 1210. In block 1235, process 1100 extracts where/what in user operations (e.g., textual words or icons) and where in the UI screen these are located. The textual words/phrases or visual icon(s) UI element(s) are extracted from the electronic devices' screen (e.g., using OCR, etc.). In block 1240, if an extracted UI element is a textual word/phrase, STaLES 300 (FIG. 3) can directly use the UI element as a slot type. In block 1240, if the extracted UI element is a visual icon, STaLES 300 can extract its semantic meaning using any approach and use the textual word of its semantic meaning as slot type. The input (part of the utterance) that the user types into the UI element is extracted as the "slot value."

In some embodiments, for user teaching with voice instructions, process 1100 uses the user instruction. In the user instruction, the user uses natural language to indicate the semantics of their operation. The semantic words from the user utterance in block 1230 are used as the slot types and block 1225 may be skipped to proceed with block 1235. In this path, the input (part of the utterance) that the user types into the UI element are used as a "slot value."

Figures 13A, 13B, 13C:
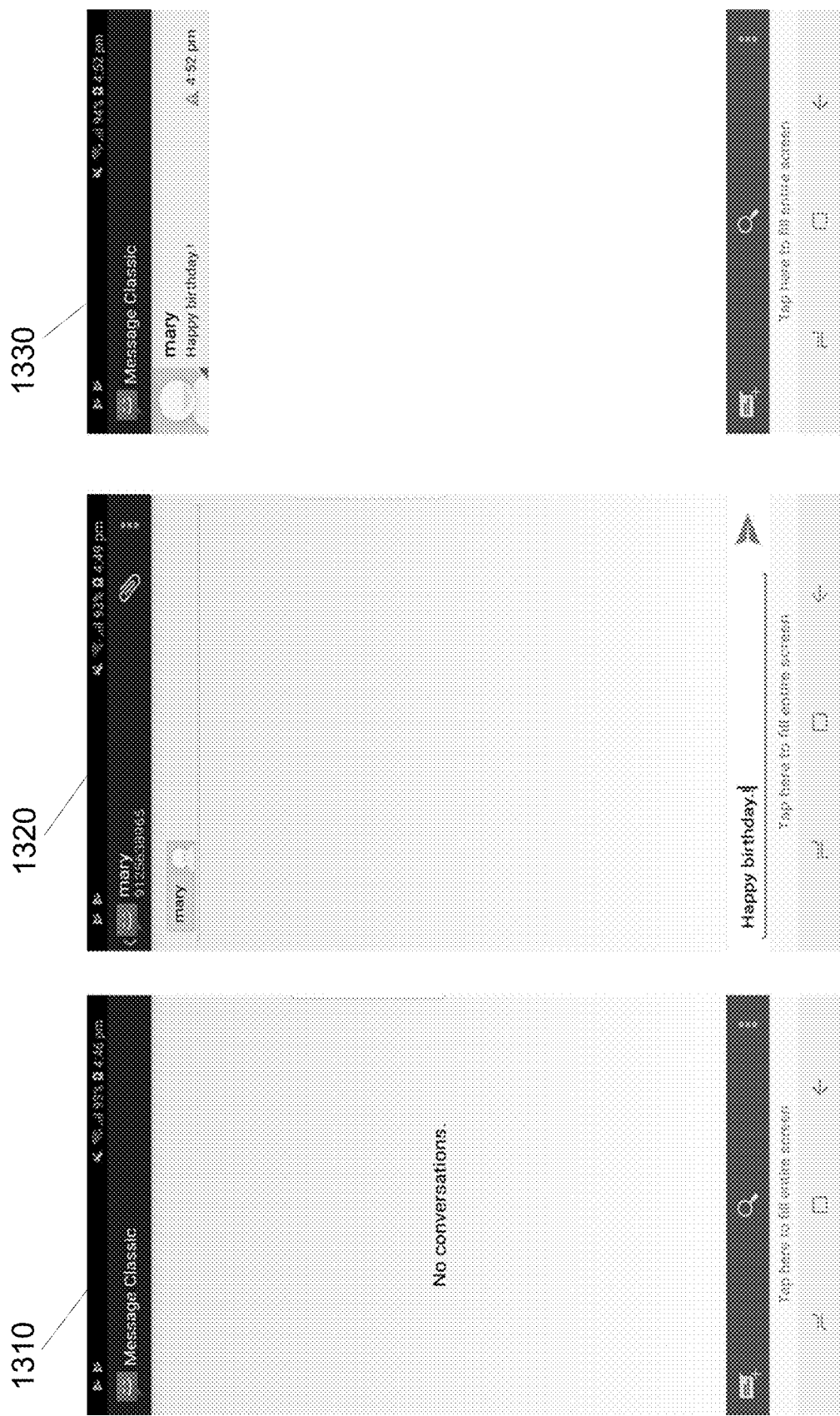
FIGS. 13A-C show example screen shots for a message app used to demonstrate a specific task, according to some embodiments.

FIGS. 13A-C show example screen shots 1310, 1320 and 1330 for a message app used to demonstrate a specific task, according to some embodiments. In one embodiment, a user teaches how to perform a task of "sending a message to someone" by demonstrating a specific task of "send a message to Mary: Happy Birthday." For the one or more embodiments, user may teach with or without voice. In FIG. 13A, the user opens a message (e.g., classic message app) app on their electronic device screen 1310. The message app presents UI elements including one or more fields awaiting user's inputs. For example, the message map may have one field asking for the recipient of the message, and another field for the body of the message. In FIG. 13B, on the message app line on screen 1320 that indicates "to search by a number or contact," the user types in "Mary." On the line that indicates "Message," the user types in "Happy Birthday." In FIG. 13C, the user clicks the "send" button to send out the message on screen 1330. Returning to FIGS. 11-12, the process 1100 performs screen tracking (in block 1225) and in block 1235 extracts "a number or contact" as one slot type of "recipient"; and extracts "Mary" as one potential slot value for this slot type. Similarly, block 1235 extracts "Message" as one slot type; and "Happy Birthday" as one potential slot value for this slot. In one or more embodiments, teaching can be performed multiple times. In one example embodiment, after a user teaches performing "send message to Mary: Happy Birthday," the user can teach again with other utterances, e.g., "Tell Amy that I am running late." On the line of the screen that indicates "to search by a number or contact," the user types in "Amy." On the line of the screen that indicates "Message," the user types in "I am running late." Then the user clicks the "send" button on the screen to send out the message. Based on these two teaching examples, block 1235 extracts "a number or contact" as a slot type "recipient"; with "Mary" as one potential slot value for this slot type and "Amy" as another potential slot value. Similarly, block 1235 processing extracts "Message" as one slot type; "Happy Birthday" as one potential slot value for this slot type and "I am running late" as another potential slot value for this slot type.

In another embodiment, a user teaches how to perform a task of "send message to someone" by demonstrating how to "send message to Mary Happy Birthday" with voice instructions. The user opens the Message (Classic) app on the electronic device screen. On the line of the screen that indicates "to search by a number or contact," the user types in "Mary" while uttering the voice instruction of "I am typing in Mary as recipient" or simply "Recipient." On the line of the screen that indicates "Message," the user types in "Happy Birthday" while uttering the voice instruction of "I am typing in Happy Birthday as message" or simply "Message." Then the user clicks the "send" button on the screen to send out the message. In block 1235, the process 1100 extracts "Recipient" as one slot type, extracts "Mary" as one potential slot value for this slot type, via NLU. The process 1100 knows that "Recipient" maps to the line "to search by a number or contact" on the screen. Similarly, in block 1235 process 1100 extracts "Message" as one slot type; and "Happy Birthday" as one potential slot value for this slot. In one or more embodiments, the teaching can be performed multiple times. After the user teaches by performing "send message to Mary Happy Birthday," the user can teach again with the other utterance of "Tell Amy that I am running late." On the line of the screen that indicates "to search by a number or contact," the user types in "Amy" while uttering the voice instruction of "I am typing in Amy as recipient." On the line of the screen that indicates "Message," the user types in "I am running late" while uttering the voice instruction of "I am typing in I am running late as message." Then the user clicks the "send" button to send out the message. Based on these two teaching instances, block 1235 extracts "recipient" as one slot type, extracts "Mary" as one potential slot value for this slot type, and "Amy" as another potential slot value. Similarly, "Message" is extracted as one slot type, "Happy Birthday" as one potential slot value for this slot type and "I am running late" as another potential slot value for this slot type. The process also will associate the message app with the determined slot type and slot value to form a task.

Figure 14:
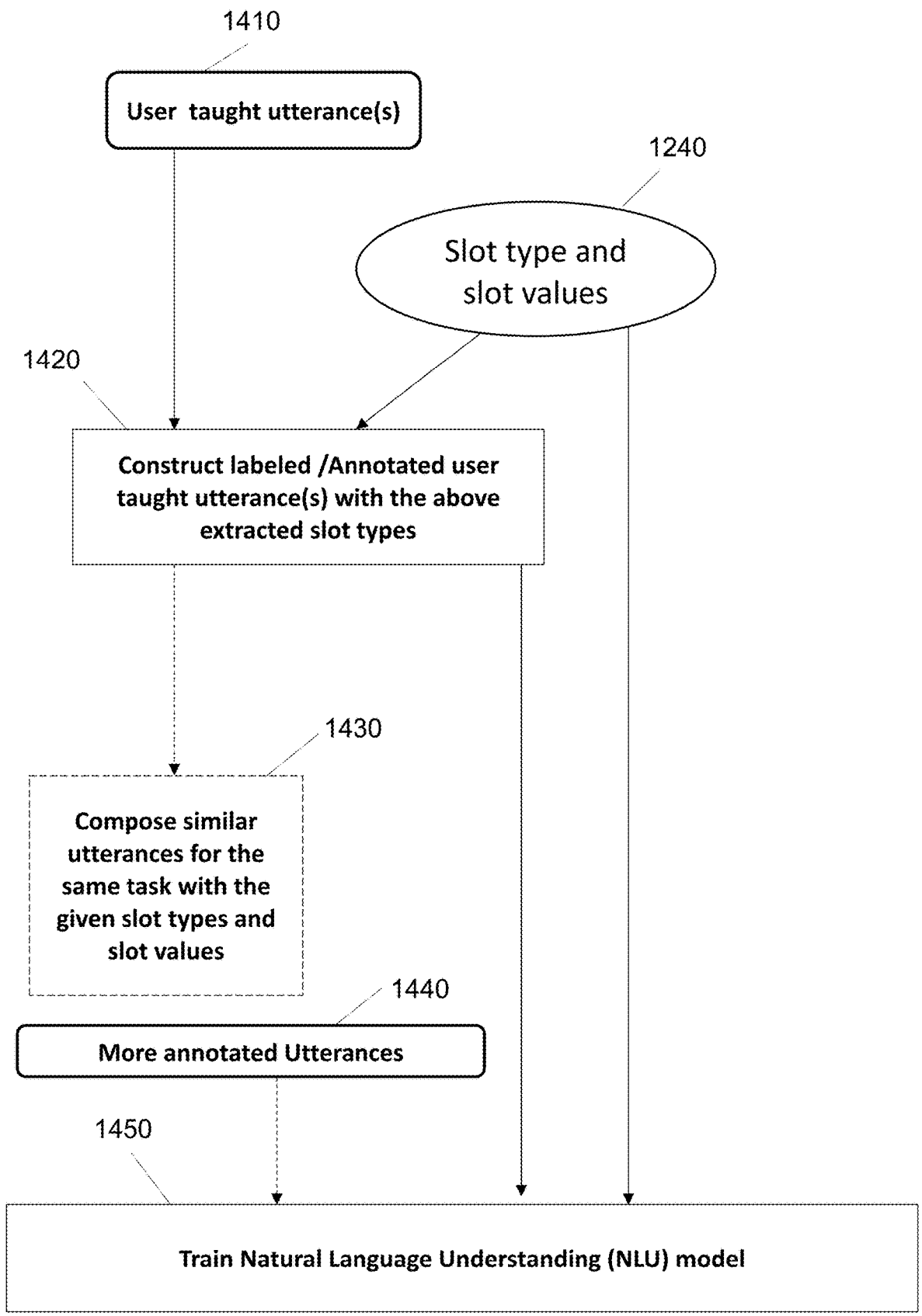
FIG. 14 shows a process flow diagram for constructing labeled utterances samples for NLU engine development, according to some embodiments.

FIG. 14 shows a process flow diagram for constructing labeled utterances samples for NLU engine development (of process 1100, FIG. 11), according to some embodiments. In one or more embodiments, a user utterance(s), associated with a new task, is input in block 1410. The extracted slot type and slot values are input in block 1420 from block 1240 (see also, FIG. 12). Block 1420 constructs further labeled/annotated user taught utterance(s) with the above extracted slot types and slot values. Utterance(s) samples for NLU engine development construct labeled utterances samples based on the extracted slot types and slot values. In block 1430, if desired, the process 1100 composes similar utterances for the same task with the given slot types and slot values, via paraphrasing. In block 1440, more annotated utterances are obtained as results from 1330, or from user inputs or other applicable sources. In block 1450, process 1100 trains the NLU model. The extracted slot types and slot values, together with the labeled utterances are needed in order to perform NL training (in block 1450) and development of an NLU engine. In one or more embodiments, any known NL training approach can be implemented. After the NLU engine is trained, the NLU engine is able to understand a new utterance in the future from a user for this newly taught task. For example, the trained NLU engine will be able to understand a new utterance "Write a message to David: where are you?" by parsing "David" as the recipient and "where are you" as the message. In one embodiment, the PA is able to invoke the message app in response to such a user utterance and send out the message accordingly.

In one example embodiment, a user teaches how to perform the task "send a message to someone" by demonstrating how to "send a message to Mary: Happy Birthday." In block 1420, process 1100 constructs a labeled data point for the NLU engine training based on the user teaching. The original teaching utterance of "send a message to Mary: Happy Birthday" is unlabeled. After user demonstration and processing in blocks 1235 (FIG. 12) and block 1420, the unlabeled utterance becomes a labeled utterance with "Mary" labeled as "recipient" slot type; and "Happy Birthday" be labeled as "message" slot type. Another teaching utterance of "Tell Amy that I am running late" now becomes labeled, with "Amy" labeled as "recipient" slot type; and "I am running late" is labeled as "message" slot type. Both taught unlabeled utterances now become labeled data points, and can be used for training the NLU engine in block 1450.

In one or more embodiments, all the user taught utterances are now labeled, and only the labeled user taught utterances are provided back for NL training in block 1450. In some embodiments, any paraphrase generator may be implemented to generate even more utterances (in block 1440) and label them with the extracted slot types. The paraphrase generator may run/execute on the cloud/server 140 (FIG. 2) or on the electronic device (e.g., electronic device 120, FIG. 2, device 1 311, FIG. 3, etc.). All the labelled utterances can provide to the NL training.

Figure 15:
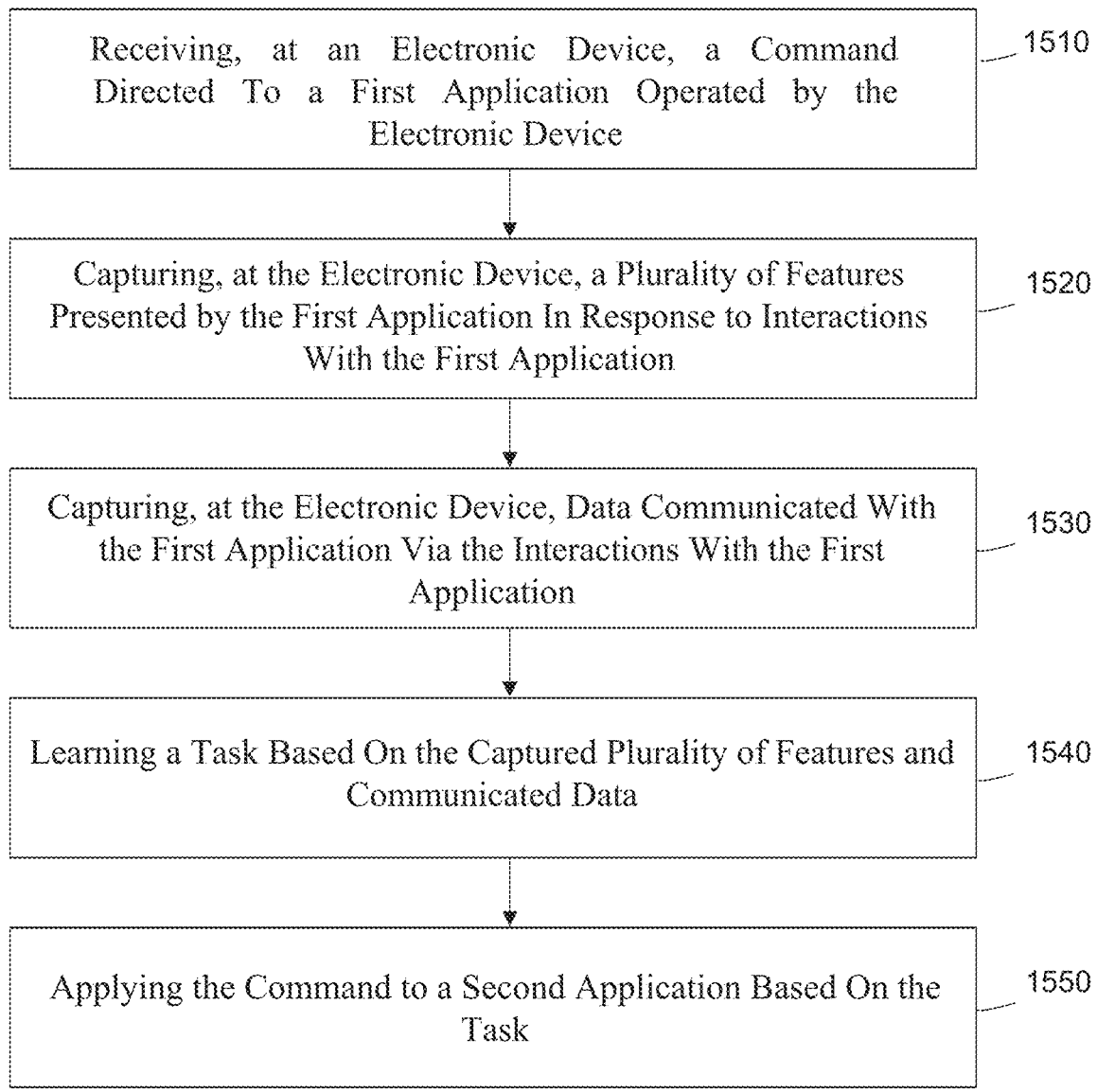
FIG. 15 shows a block diagram of a process for intelligent task learning and adaptive processing, according to some embodiments.

FIG. 15 shows a block diagram of a process 1500 for intelligent task learning and adaptive processing, according to some embodiments. In some embodiments, in block 1510 process 1500 includes receiving, at an electronic device (e.g., electronic device 120, FIG. 2, device 1 311, FIG. 3, system 1600, FIG. 16, etc.), a command (e.g., a voice command received by a PA, etc.) directed to a first application (or app) operated by the electronic device. In block 1520, process 1500 captures (e.g., using STaLES 300, FIG. 3) at the electronic device, multiple features (e.g., features displayed by the first application, UI elements) presented by the first application in response to interactions with the first application. In block 1530, process 1500 captures (using STaLES 300), at the electronic device, data communicated (e.g., textual, voice, icon, etc. UI elements) with the first application via the interactions with the first application. In block 1540, process 1500 learns a task based on the captured multiple features and communicated data. In block 1550, process 1500 applies the command to a second application (e.g., a different version of the first application, a similar type of application, etc.) based on the task.

In some embodiments, process 1500 may include constructing a graph (e.g., a UI tree of element semantic data 413, FIG. 3) representing correlations between the communicated data. The communicated data includes user voice data. Process 1500 may further include determining semantic meaning of the captured multiple features based on the graph. The multiple features may include textual features, icon features, or both.

In one or more embodiments, in process 1500 applying the command to a second application based on the task may further include selecting the task from a task set based on the command, applying the task to carry out a part of interactions with the second application, and applying another task from a different task set to supplement remaining interactions with the second application.

In some embodiments, the task includes: a set of data representing a sequence of actions interacting with the first application, and a semantic block queue associated with the sequence of actions. The multiple features include visual features including UI elements.

In one or more embodiments, process 1500 may include extracting, from the interactions with the first application, slot type (e.g., UI entry slot type) and slot value (e.g., UI entry data value). For the interactions with the first application without voice instruction, the extracting includes an extraction of textual data UI elements or one or more visual icons from an interface displayed by the electronic device; the textual data are used directly as a slot type. The one or more visual icons are processed to extract semantic meaning, and the semantic meaning is used as another slot type.

In some embodiments, in process 1500 for the interactions with the first application with voice instruction, at least a portion of the voice instruction is used as the slot value.

In one or more embodiments, process 1500 may further include constructing labeled utterance samples for NLU engine development based on the slot type and the slot value.

FIG. 16 is an exemplary high-level block diagram showing an information processing system comprising a computing system implementing one or more embodiments. The system 1600 includes one or more processors 1611 (e.g., ASIC, CPU, etc.), and may further include an electronic display device 1612 (for displaying graphics, text, and other data), a main memory 1613 (e.g., random access memory (RAM), cache devices, etc.), storage device 1614 (e.g., hard disk drive), removable storage device 1615 (e.g., removable storage drive, removable memory, a magnetic tape drive, optical disk drive, computer-readable medium having stored therein computer software and/or data), user interface device 1616 (e.g., keyboard, touch screen, keypad, pointing device), and a communication interface 1617 (e.g., modem, wireless transceiver (such as Wi-Fi, Cellular), a network interface (such as an Ethernet card), a communications port, or a PCMCIA slot and card).

The communication interface 1617 allows software and data to be transferred between the computer system and external devices through the Internet 1650, mobile electronic device 1651, a server 1652, a network 1653, etc. The system 1600 further includes a communications infrastructure 1618 (e.g., a communications bus, cross bar, or network) to which the aforementioned devices 1611 through 1617 are connected.

The information transferred via communications interface 1617 may be in the form of signals such as electronic, electromagnetic, optical, or other signals capable of being received by communications interface 1617, via a communication link that carries signals and may be implemented using wire or cable, fiber optics, a phone line, a cellular phone link, a radio frequency (RF) link, and/or other communication channels.

In one implementation of one or more embodiments in an electronic device (e.g., electronic device 120, FIG. 2), the system 1600 further includes an image capture device 1620, such as a camera 128 (FIG. 2), and an audio capture device 1619, such as a microphone 122 (FIG. 2). The system 1600 may further include application processing or processors as MMS 1621, SMS 1622, email 1623, social network interface (SNI) 1624, audio/video (AV) player 1625, web browser 1626, image capture 1627, etc.

In some embodiments, the system 1600 includes intelligent learning processing 1630 that may implement processing similar as described regarding ILS 300 processing (FIG. 3), flow 400 processing (FIG. 4), flow 500 processing (FIG. 5), flow 600 processing (FIG. 6), flow 700 processing (FIG. 7), flow 800 processing (FIG. 8) and process 1400 (FIG. 13), as described above. In one embodiment, the intelligent learning processing 1630 along with an operating system (O/S) 1629 may be implemented as executable code residing in a memory of the system 1600. In another embodiment, the intelligent learning processing 1630 may be provided in hardware, firmware, etc.

In one embodiment, the main memory 1613, storage device 1614 and removable storage device 1615, each by themselves or in any combination, may store instructions for the embodiments described above that may be executed by the one or more processors 1611.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method, comprising:
receiving, at an electronic device, a command directed to a first application operated by the electronic device;
identifying, at the electronic device, a plurality of features including elements and icons on each display screen of the first application;
determining, at the electronic device, input data for the plurality of features presented by the first application in response to user interface interactions comprising the input data provided while executing a task within the first application, wherein the determined input data for each of the plurality of features is obtained from actions performed from the user interface interactions and type of feature, and the input data of each of the plurality of features is identified based on feature functional properties;
capturing, at the electronic device, the input data communicated with the first application via the user interface interactions with the first application;
learning the task based on the determined input data of the plurality of features and communicated data; and
applying, at the electronic device, the command to a second application using task data and application package data from a bytecode executable that is based on a sequence of semantic events where each semantic event includes data providing a target user interface entry element, values of input data, priority in event sequence and type of event.

2. The method of claim 1, further comprising:
constructing a graph representing correlations between the communicated data, wherein the communicated data includes voice data; and
determining semantic meaning of the determined input data of the plurality of features based on the graph, wherein the input data of the plurality of features comprises textual feature data and icon representation for a function as feature data.

3. The method of claim 1, further comprising:
selecting the task from a task set based on the command;
applying the task to carry out a part of interactions with the second application; and
applying another task from a different task set to supplement remaining interactions with the second application,
wherein the second application executes on a different type of electronic device platform than the first application, and the second platform includes input data interface variations with different user interface entry elements between the first application and the second application that both share common functionality.

4. The method of claim 1, wherein:
the task includes: a set of data representing a sequence of actions interacting with the first application and a semantic block queue associated with the sequence of actions.

5. The method of claim 1, wherein the plurality of features includes visual features comprising user interface elements.

6. The method of claim 1, further comprising:
extracting, from the user interface interactions with the first application, slot type and slot value;
wherein:
for the user interface interactions with the first application without voice instruction, the extracting includes an extraction of one of textual data or one or more visual icons from an interface displayed by the electronic device;
the textual data are used directly as a slot type; and
the one or more visual icons are processed to extract semantic meaning, and the semantic meaning is used as another slot type.

7. The method of claim 6, wherein for the user interface interactions with the first application with voice instruction, at least a portion of the voice instruction is used as the slot type, and another portion of the voice instruction is used as the slot value.

8. The method of claim 6, further comprising constructing labeled utterance samples for natural language understanding engine development based on the slot type and the slot value.

9. An electronic device comprising:
a memory storing instructions; and
at least one processor executing the instructions including a process configured to:
receive, at the electronic device, a command directed to a first application operated by the electronic device;
identify, at the electronic device, a plurality of features including elements and icons on each display screen of the first application;
determine, at the electronic device, input data for the plurality of features presented by the first application in response to user interface interactions comprising the input data provided while executing a task within the first application, wherein the determined input data for each of the plurality of features is obtained from actions performed from the user interface interactions and type of feature, and the input data of each of the plurality of features is identified based on feature functional properties;
capture, at the electronic device, the input data communicated with the first application via the user interface interactions with the first application;
learn the task based on the determined input data of the plurality of features and communicated data; and
apply, at the electronic device, the command to a second application using task data and application package data from a bytecode executable that is based on a sequence of semantic events where each semantic event includes data providing a target user interface entry element, values of input data, priority in event sequence and type of event.

10. The electronic device of claim 9, wherein the process is further configured to:
construct a graph representing correlations between the communicated data, wherein the communicated data includes voice data; and
determine semantic meaning of the determined input data of the plurality of features based on the graph, wherein the input data of the plurality of features comprises textual feature data and icon representation for a function as feature data.

11. The electronic device of claim 9, wherein the process is further configured to:
select the task from a task set based on the command;
apply the task to carry out a part of interactions with the second application; and
apply another task from a different task set to supplement remaining interactions with the second application,
wherein the second application executes on a different type of electronic device platform than the first application, and the second platform includes input data interface variations with different user interface entry elements between the first application and the second application that both share common functionality.

12. The electronic device of claim 9, wherein:
the task includes: a set of data representing a sequence of actions interacting with the first application, and a semantic block queue associated with the sequence of actions; and
the plurality of features includes visual features comprising user interface elements.

13. The electronic device of claim 9, wherein:
the process is further configured to:
extract, from the user interface interactions with the first application, slot type and slot value; and
for the user interface interactions with the first application without voice instruction, extract one of textual data or one or more visual icons from an interface displayed by the electronic device, the textual data are used directly as a slot type, the one or more visual icons are processed to extract semantic meaning, and the semantic meaning is used as another slot type; and
for the user interface interactions with the first application with voice instruction: at least a portion of the voice instruction is used as the slot type, and another portion of the voice instruction is used as the slot value.

14. The electronic device of claim 13, wherein the process is further configured to:
construct labeled utterance samples for natural language understanding engine development based on the slot type and the slot value.

15. A non-transitory processor-readable medium that includes a program that when executed by a processor performing a method comprising:
receiving, at an electronic device, a command directed to a first application operated by the electronic device;
identifying, at the electronic device, a plurality of features including elements and icons on each display screen of the first application;

determining, at the electronic device, input data for the plurality of features presented by the first application in response to user interface interactions comprising the input data provided while executing a task within the first application, wherein the determined input data for each of the plurality of features is obtained from actions performed from the user interface interactions and type of feature, and the input data of each of the plurality of features is identified based on feature functional properties;

capturing, at the electronic device, input data communicated with the first application via the user interface interactions with the first application;

learning the task based on the determined input data of the plurality of features and communicated data; and applying, at the electronic device, the command to a second application using task data and application package data from a bytecode executable that is based on a sequence of semantic events where each semantic event includes data providing a target user interface entry element, values of input data, priority in event sequence and type of event.

16. The non-transitory processor-readable medium of claim 15, wherein the method further comprising:

constructing a graph representing correlations between the communicated data, wherein the communicated data includes voice data; and determining semantic meaning of the determined input data of the plurality of features based on the graph, wherein the input data of the plurality of features comprises textual feature data and icon representation for a function as feature data.

17. The non-transitory processor-readable medium of claim 15, wherein the method further comprising:

selecting the task from a task set based on the command;

applying the task to carry out a part of interactions with the second application; and applying another task from a different task set to supplement remaining interactions with the second application, wherein the second application executes on a different type of electronic device platform than the first application, and the second platform includes input data interface variations with different user interface elements between the first application and the second application that both share common functionality.

18. The non-transitory processor-readable medium of claim 15, wherein:

the task includes: a set of data representing a sequence of actions interacting with the first application, and a semantic block queue associated with the sequence of actions; and the plurality of features includes visual features comprising user interface elements.

19. The non-transitory processor-readable medium of claim 15, wherein the method further comprising:

extracting, from the user interface interactions with the first application, slot type and slot value; and for the user interface interactions with the first application without voice instruction, extracting one of textual data or one or more visual icons from an interface displayed by the electronic device;

wherein:

the textual data are used directly as a slot type;

the one or more visual icons are processed to extract semantic meaning;

the semantic meaning is used as another slot type; and for the interactions with the first application with voice instruction, at least a portion of the voice instruction is used as the slot type, and another portion of the voice instruction is used as the slot value.

20. The non-transitory processor-readable medium of claim 19, wherein the method further comprising:

constructing labeled utterance samples for natural language understanding engine development based on the slot type and the slot value.

21. An electronic device comprising:

a memory storing instructions; and at least one processor executing the instructions, the at least one processor configured to:

receive, at the electronic device, a command directed to a first application operated by the electronic device;

identify, at the electronic device, a plurality of features including elements and icons on each display screen of the first application;

capture, at the electronic device, metadata information from user interface interactions comprising input data provided while executing a task within the first application, wherein the input data of each of the plurality of features is identified based on feature functional properties;

extract, from the metadata information based on the input data from the user interface interactions with the first application while executing the task, slot type and slot value for understanding of the command; and applying, at the electronic device, the command to a second application using task data and application package data from a bytecode executable that is based on a sequence of semantic events where each semantic event includes data providing a target user interface entry element, values of input data, priority in event sequence and type of event.

22. The electronic device of claim 21, wherein:

the at least one processor is further configured to:

extract textual data and one or more visual icons that represent functions from an interface displayed by the electronic device for the user interface interactions with the first application without voice instruction, wherein the textual data or the one or more visual icons is identified based on actions performed and type of feature; and capture, at the electronic device, the plurality of features presented by the first application in response to the user interface interactions with the first application;

the textual data are used directly as a slot type; and the one or more visual icons are processed to extract semantic meaning, and the semantic meaning is used as another slot type.

23. The electronic device of claim 22, wherein the at least one processor is further configured to:

capture, at the electronic device, data communicated with the first application associated with the user interface interactions with the first application;

capture, at the electronic device, a plurality of features presented by the first application in response to the user interface interactions with the first application; and learn a task associated with the command based on the plurality of features and communicated data.

24. The electronic device of claim 23, wherein the user interface interactions with the first application comprises voice instruction, at least a portion of the voice instruction is used as the slot type, and another portion of the voice instruction is used as the slot value.

25. The electronic device of claim 23, wherein the at least one processor is further configured to:

construct labeled utterance samples for natural language understanding engine development based on the slot type and the slot value;

construct a graph representing correlations between the communicated data, wherein the communicated data includes voice data; and determine semantic meaning of the captured plurality of features based on the graph, wherein the plurality of features comprises at least one of textual features or icon features.

26. The electronic device of claim 25, wherein the at least one processor is further configured to:

select the task from a task set based on the command;

apply the task to carry out a part of interactions with the second application; and apply another task from a different task set to supplement remaining interactions with the second application, wherein the second application executes on a different type of electronic device platform than the first application, and the second platform includes input data interface variations with different user interface entry elements between the first application and the second application that both share common functionality.

27. The electronic device of claim 25, wherein:

the task includes: a set of data representing a sequence of actions interacting with the first application, and a semantic block queue associated with the sequence of actions; and the plurality of features includes visual features comprising user interface elements.

* * * * *